(12) United States Patent
Nagata et al.

(10) Patent No.: US 8,201,982 B2
(45) Date of Patent: Jun. 19, 2012

(54) PLANAR ILLUMINATION DEVICE AND LIQUID CRYSTAL DISPLAY DEVICE USING THE SAME

(75) Inventors: Takayuki Nagata, Osaka (JP); Kazuhisa Yamamoto, Osaka (JP); Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 395 days.

(21) Appl. No.: 12/525,741

(22) PCT Filed: Dec. 5, 2008

(86) PCT No.: PCT/JP2008/003611
§ 371 (c)(1),
(2), (4) Date: Aug. 4, 2009

(87) PCT Pub. No.: WO2009/072296
PCT Pub. Date: Jun. 11, 2009

(65) Prior Publication Data
US 2010/0026929 A1  Feb. 4, 2010

(30) Foreign Application Priority Data

Dec. 6, 2007  (JP) ................................. 2007-315603
Dec. 18, 2007  (JP) ................................. 2007-325554

(51) Int. Cl.
*F21V 8/00* (2006.01)
(52) U.S. Cl. ........................... 362/556; 362/97.2; 349/62
(58) Field of Classification Search .................. 362/556, 362/1, 553, 561, 97.1, 97.2, 259; 349/62; 385/146, 147, 901
See application file for complete search history.

(56) References Cited

U.S. PATENT DOCUMENTS

| | | | |
|---|---|---|---|
| 5,226,105 A | 7/1993 | Myers | |
| 5,479,187 A * | 12/1995 | Chen | 345/102 |
| 6,643,439 B2 * | 11/2003 | Notomi et al. | 385/125 |
| 6,697,197 B2 * | 2/2004 | Sedlmayr | 359/487.02 |
| 6,798,820 B2 * | 9/2004 | Okuwaki et al. | 372/107 |
| 6,799,850 B2 * | 10/2004 | Hong et al. | 353/30 |
| 7,812,900 B2 * | 10/2010 | Hung et al. | 349/65 |
| 2003/0090605 A1 | 5/2003 | Bruning et al. | |
| 2006/0008237 A1 * | 1/2006 | Imade | 385/146 |
| 2008/0111471 A1 | 5/2008 | Blumel et al. | |

(Continued)

FOREIGN PATENT DOCUMENTS
CN  2366925  3/2000
(Continued)

OTHER PUBLICATIONS

International Search Report issued Jan. 6, 2009 in the International (PCT) Application No. PCT/JP2008/003611.

*Primary Examiner* — Sharon Payne
(74) *Attorney, Agent, or Firm* — Wenderoth, Lind & Ponack, L.L.P.

(57) ABSTRACT

A planar illumination device is provided with a plurality of light guide paths, on which scanned light in different scanning sections of a scanning range by a scanning unit is respectively incident, and an illumination unit having a plurality of emission regions for emitting the light guided by the respective light guide paths. The number of the emission regions is 2 or more and 1000 or less, and the respective emission regions successively become luminous as the scanned light is incident on the respective light guide paths.

25 Claims, 26 Drawing Sheets

U.S. PATENT DOCUMENTS

2009/0303417 A1   12/2009   Mizushima et al.

FOREIGN PATENT DOCUMENTS

| | | |
|---|---|---|
| CN | 1582376 | 2/2005 |
| JP | 2004-191675 | 7/2004 |
| JP | 2005-189682 | 7/2005 |
| JP | 2007-86793 | 4/2007 |
| JP | 2007-140009 | 6/2007 |
| JP | 2007-214142 | 8/2007 |
| JP | 2007-294385 | 11/2007 |
| WO | 2006/076899 | 7/2006 |
| WO | 2007/058203 | 5/2007 |

* cited by examiner

PLANAR ILLUMINATION DEVICE AND LIQUID CRYSTAL DISPLAY DEVICE USING THE SAME

FIELD OF TECHNOLOGY

The present invention relates to a planar illumination device using a laser beam as a light source and a liquid crystal display device using such a planar illumination device.

BACKGROUND TECHNOLOGY

Planar illumination devices generally using discharge tubes, light-emitting diodes (LEDs) and the like as backlight illumination are used for liquid crystal display devices used in display panels and the like. When these planar illumination devices are used in large-size displays and the like, light of high luminance and high chromaticity is required. Thus, in recent years, investigations have been started for constructions using laser light sources.

It is hoped that such display panels are applied to wall-mounted televisions, wherefore there is a strong demand to make display panels larger and thinner and reduce the power consumption thereof.

Since 60% or more of power is consumed for backlight illumination in large-size liquid crystal televisions, it is essential to reduce power consumption of the backlight illumination. In addition to elaboration to improve light utilization efficiency of the backlight illumination, a method for suppressing an emission amount of a light source by finely adjusting the backlight illumination in conformity with a video scene (backlight control) has been proposed and put to practical use as a method for reducing the power consumption. In this backlight control, about 20% of the power consumption of the backlight can be reduced as compared with the case where the backlight is constantly illuminated with a maximum luminance.

As a development of this backlight control, technology for dividing a screen into a plurality of regions and adjusting the luminance of a backlight for each region (local dimming) has also been proposed.

A construction capable of adjusting the luminance of the backlight for each region may be a direct backlight construction in which LED elements are planarly arranged or a construction in which a plurality of edge-light type light guide plates are arranged to permit light to be incident on side surfaces and emitted from principal surfaces, for example, as disclosed in patent literature 1.

Further, a laser projector has been proposed as an image display device for adjusting luminance pixel by pixel (for example, patent literature 2).

However, in the construction in which the LED elements are planarly arranged, it is difficult to make the display panel thinner because a light source and a liquid crystal display panel need to be distant to obtain uniform illumination. If the number of LED elements is increased for thinning, cost becomes a problem.

In the construction disclosed in patent literature 1, if an attempt is made to increase vertical and horizontal partition numbers of the screen to improve the effect of reducing the power consumption, the numbers of fluorescent lamps as light sources and driving circuits also increase, which leads to a considerable cost increase.

The construction disclosed in patent literature 2 is expensive and difficult to make thinner since a considerably large number of optical fibers are required.

In order to modulate luminance pixel by pixel by scanning the screen as disclosed in patent literature 2, the light quantities of light sources need to be modulated at high speed and an external modulator is necessary at least for a green light source. This is because a SHG light source using solid-state laser beam or fiber laser beam as a fundamental wave is generally used for a green laser light source and this type of light source cannot be modulated at high speed. Thus, it is normally necessary to realize the modulation of the green light source by modulating transmittance using an external modulator with the green light source constantly turned on, which does not lead to a reduction of power consumption.

Patent Literature 1:
  Japanese Unexamined Patent Publication No. 2007-214142
Patent Literature 2:
  Japanese Unexamined Patent Publication No. 2007-140009

DISCLOSURE OF THE INVENTION

An object of the present invention is to provide a planar illumination device capable of being thinned and adjusting luminance for each of multiple divided regions and a liquid crystal display device using such a planar illumination device.

One aspect of the present invention is directed to a planar illumination device, comprising a light source; a scanning unit for scanning light emitted from the light source to generate scanned light; a plurality of light guide paths, on which the scanned light in different scanning sections of a scanning range by the scanning unit is respectively incident; and an illumination unit having a plurality of emission regions for emitting the light guided by the respective light guide paths, wherein the number of the emission regions is 2 or more and 1000 or less; and the respective emission regions successively become luminous as the scanned light is incident on the respective light guide paths.

Another aspect of the present invention is directed to a liquid crystal display device, comprising a liquid crystal display panel; and a backlight illumination device for illuminating the liquid crystal display panel from behind, wherein the above planar illumination device is used as the backlight illumination device.

Still another aspect of the present invention is directed to a liquid crystal display device, comprising a liquid crystal display panel; and a backlight illumination device for illuminating the liquid crystal display panel from behind, wherein a planar illumination device according to claim 3 is used as the backlight illumination device; and a light source controller sets a luminance distribution of a corresponding region of the planar illumination device in accordance with a luminance distribution of each color of each region of image data to be displayed on the liquid crystal display panel.

According to the present invention, a planar illumination device capable of being thinned and adjusting luminance for each of multiple divided regions and a liquid crystal display device using such a planar illumination device can be provided.

BEST MODES FOR EMBODYING THE INVENTION

Figure 1:
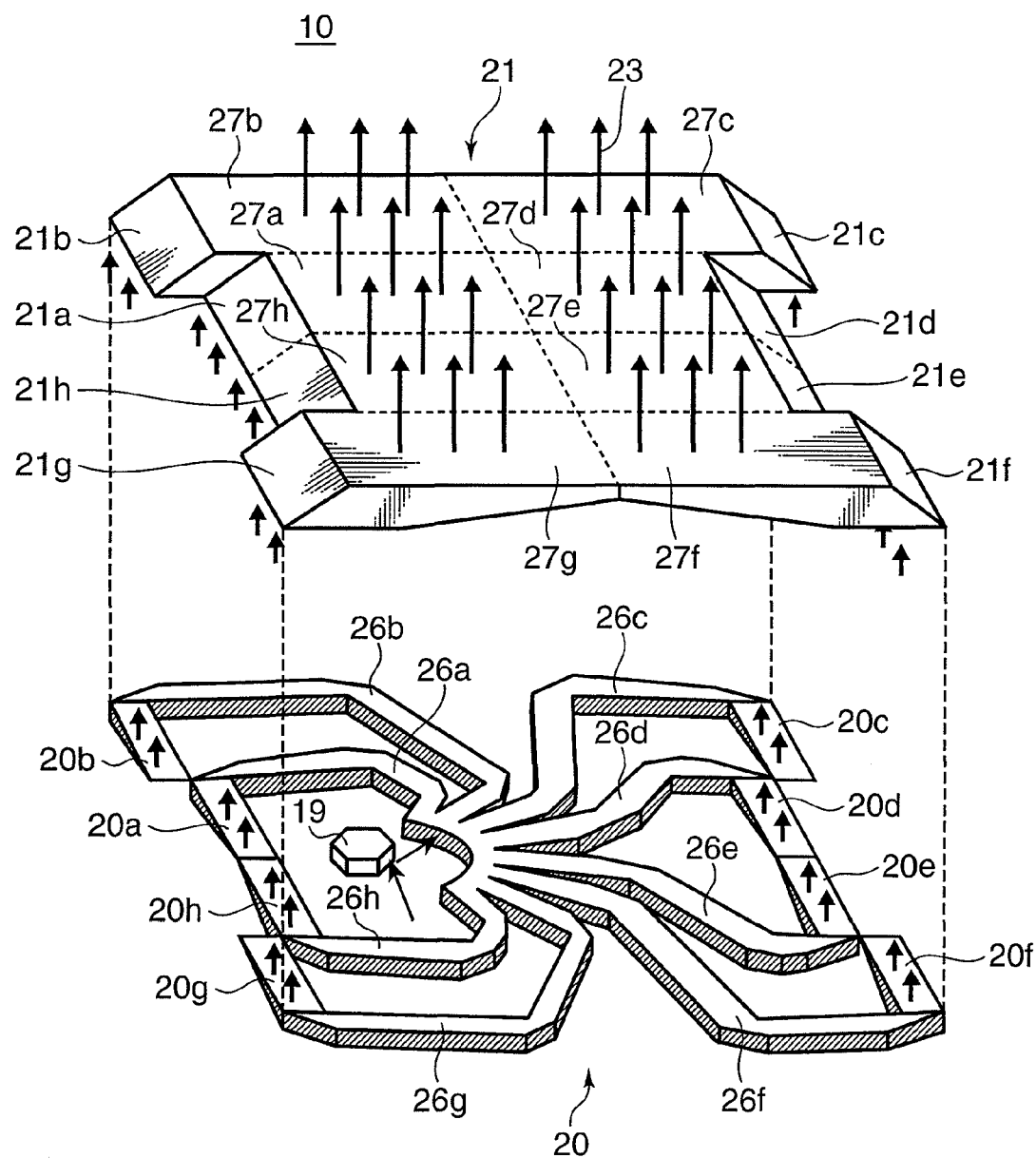
FIG. 1 is a perspective view showing a schematic construction of a planar illumination device according to a first embodiment.

Hereinafter, embodiments of the present invention are described with reference to the drawings. The same elements are identified by the same reference numerals and not repeatedly described in some cases. Main constituent elements are diagrammatically shown in the drawings to facilitate the understanding of the invention.

First Embodiment

Figure 2:
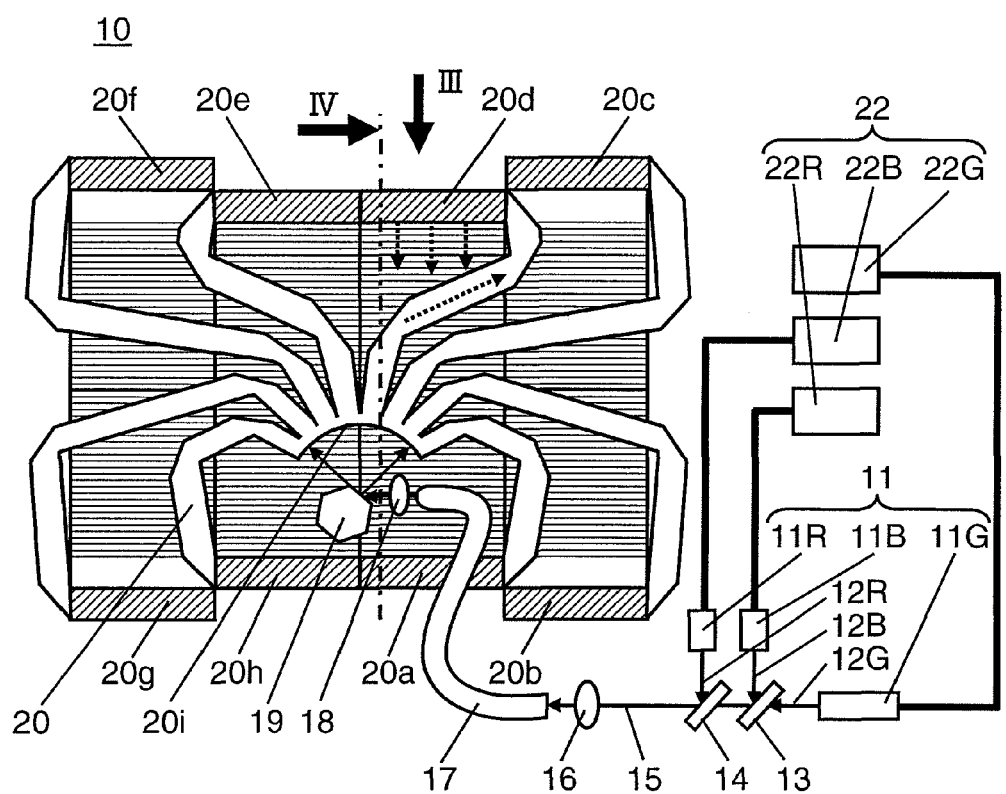
FIG. 2 is a schematic construction diagram of the planar illumination device of FIG. 1 when viewed from behind.
Figure 3:
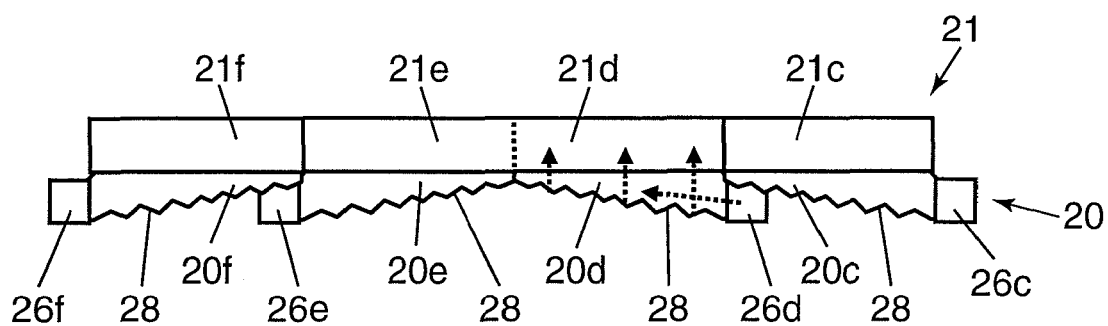
FIG. 3 is a side view showing an essential portion of the planar illumination device when viewed in a direction III of FIG. 2.
Figure 4:
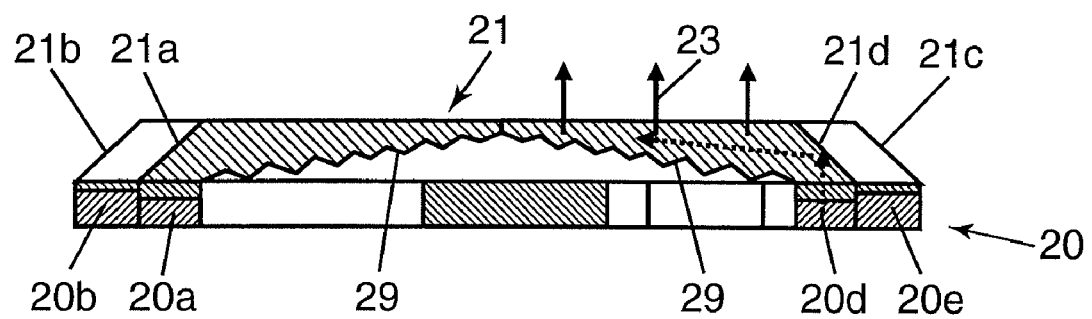
FIG. 4 is a section showing the essential portion of the planar illumination device when viewed in a direction IV of FIG. 2.

FIG. 1 is a perspective view showing a schematic construction of a planar illumination device 10 according to a first embodiment, FIG. 2 is a schematic construction diagram of the planar illumination device 10 of FIG. 1 when viewed from behind, FIG. 3 is a side view showing an essential portion of the planar illumination device when viewed in a direction III of FIG. 2, and FIG. 4 is a section showing the essential portion of the planar illumination device when viewed in a direction IV of FIG. 2.

In FIGS. 1 to 4, the planar illumination device 10 is provided with laser light sources 11, dichroic mirrors 13, 14 for combining laser beams emitted from the laser light sources 11, a condenser lens 16, an optical fiber 17, a collimator lens 18, a polygon mirror 19 for polarizing and scanning light emerging from the optical fiber 17, a branched light guide 20, a light guide plate 21 and light source controllers 22. Shown broken lines indicate light propagating in the branched light guide 20 and the light guide plate 21.

The laser light sources 11 includes a red laser light source (R light source) 11R, a green laser light source (G light source) 11G and a blue laser light source (B light source) 11B.

The dichroic mirrors 13, 14 combine a red laser beam (R light) 12R, a green laser beam (G light) 12G and a blue laser beam (B light) 12B emitted from the respective laser light sources 11R, 11G and 11B into a laser beam 15.

The branched light guide 20 has an incident surface 20i, on which scanned light from the polygon mirror 19 is incident, eight light guide paths 26a to 26h for guiding the scanned light incident on the incident surface 20i, and linear emitting portions 20a to 20h for linearly emitting light guided by the light guide paths 26a to 26h.

The light guide paths 26a to 26h are designed such that scanned light in different scanning sections of a scanning range by the polygon mirror 19 are respectively incident. In other words, scanned light incident on the incident surface 20i is branched into eight to be guided to the respective light guide paths 26a to 26h. The respective light guide paths 26a to 26h are formed to guide the scanned light to the linear emitting portions 20a to 20h.

The branched light guide 20 is made of, for example, acryl and formed such that light incident on the branched light guide 20 propagates toward the linear emitting portions while being repeatedly totally reflected by side surfaces of the branched light guide 20.

The linear emitting portions 20a to 20h have a substantially rectangular cross sectional shape. Further, deflecting grooves for deflecting the light propagating in the light guide toward the light guide plate 21 are formed in surfaces of the linear emitting portions 20a to 20h opposite to those adjacent to the light guide plate 21 as shown in FIG. 3.

As shown in FIGS. 1 to 4, the light guide plate 21 includes a plurality of incident portions respectively arranged in close contact with the linear emitting portions 20a to 20h of the branched light guide 20, reflecting portions 21a to 21h for deflecting light incident on the respective incident portions and eight emission regions 27a to 27h corresponding to the respective incident portions and is formed such that light incident on the respective incident portions is emitted from the emission regions 27a to 27h. Light emitted from the light guide plate 21 is identified by reference numeral 23.

The reflecting portions 21a to 21h deflect the light incident perpendicularly to a principal surface from the respective incident portions in a direction parallel to the principal surface. Deflecting grooves 29 for deflecting the propagating light guided from the respective reflecting portions 21a to 21h toward the emission regions 27a to 27h are formed in a surface of the light guide plate 21 facing the respective emission regions 27a to 27h.

Although the light guide plate 21 includes a plurality of incident portions and a plurality of corresponding emission regions 27a to 27h in this embodiment, a plurality of separate light guide plates may be arranged to form one light guide plate as a whole.

Although the branched light guide 20 and the light guide plate 21 are shown to be separated in order to make the construction easily seen in FIG. 1, the branched light guide 20 and the light guide plate 21 are so placed one above the other that the linear emitting portions 20a to 20h of the branched light guide 20 and the incident portions of the light guide plate 21 are held in close contact as shown in FIGS. 2 to 4.

The light source controllers 22 include a R light source controller for controlling an emission light quantity of the R light source 11R, a G light source controller 22G for controlling an emission light quantity of the G light source 11G and a B light source controller 22B for controlling an emission light quantity of the B light source 11B.

Here, the emission light quantity of the light source may be controlled by controlling an emission amount of continuously oscillating laser beam or may be controlled by the number of pulse emissions of a laser beam.

Next, the operation of the planar illumination device 10 constructed as above is described.

As shown in FIG. 2, laser beams 12R, 12G and 12B emitted from the R light source 11R, the G light source 11G and B light source 11B are combined by the dichroic mirrors 13, 14 into one laser beam 15 as RGB light.

The laser beam 15 is guided into the optical fiber 17 by being condensed by the condenser lens 16. The laser beam 15 emitted from the optical fiber 17 is converted into parallel light or convergent light by the collimator lens 18, reaches the polygon mirror 19, and is deflected and scanned by the polygon mirror 19 to be incident on the incident surface 20i of the branched light guide 20.

The scanned light incident on the branched light guide 20 is incident on any one of the branched eight light guide paths 26a to 26h according to the scanning section and propagates in the light guide path 26a to 26h while being repeatedly totally reflected. The scanned light propagating in the light guide path 26a to 26h reaches any one of the linear emitting portions 20a to 20h respectively located at the leading ends of the respective light guide paths 26a to 26h. Since the linear emitting portion 20a to 20h reached by the scanned light changes according to the scanning section of the polygon mirror 19, the scanned light is not simultaneously guided to a plurality of linear emitting portions 20a to 20h and the linear emitting portions 20a to 20h for emitting the scanned light are successively switched according to the scanning of the polygon mirror 19.

Here, for example, light having reached the linear emitting portion 20d is deflected by the deflecting grooves 28 in a direction substantially perpendicular to the principal surface (emission region 27d) of the light guide plate 21 to be incident on the light guide plate 21 as shown in FIG. 3. This light is reflected by the reflecting portion 21d of the light guide plate 21 to propagate in a direction parallel to the light guide plate 21, deflected by the deflecting grooves 29 formed in the light guide plate 21 to be emitted as irradiation light 23 from the principal surface of the light guide plate 21 as shown in FIG. 4. At this time, since the linear emitting portions 20a to 20h for emitting the light from the branched light guide 20 toward the light guide plate 21 are successively switched, the eight divided emission regions 27a to 27h of the light guide plate 21 successively become luminous according to the scanning of the polygon mirror 19.

According to the thus constructed planar illumination device 10, highly uniform illumination can be realized by keeping the emission light quantities of the light sources constant.

Further, if the emission light quantities are controlled in accordance with an emission timing of the irradiation light 23 from each of the emission regions 27a to 27h using the light source controllers 22, it is also possible to change luminance for each of the emission regions 27a to 27h.

Furthermore, by independently controlling the light quantities of the respective colors emitted from the respective light sources 11R, 11G, 11B, a ratio of RGB light emitted for each region can be changed.

Since the planar illumination device 10 according to the above embodiment includes a small number of optical elements, it is possible to realize high light utilization efficiency and to make the planar illumination device thinner.

Figure 5:
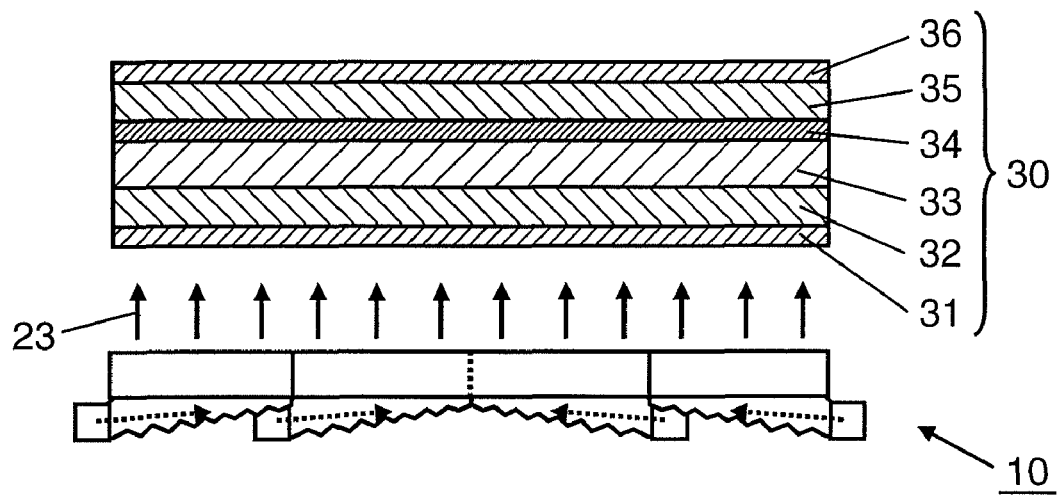
FIG. 5 is a schematic construction diagram of a liquid crystal display device using the planar illumination device shown in FIGS. 1 to 4 as a backlight illumination device.

FIG. 5 shows a schematic construction of a liquid crystal display device 25 using the planar illumination device 10 shown in FIGS. 1 to 4 as a backlight illumination device. Specifically, FIG. 5 is a schematic section showing the planar illumination device 10 shown in FIG. 3 and a liquid crystal display panel 30.

With reference to FIG. 5, the liquid crystal display device 25 is provided with the liquid crystal display panel 30 and the planar illumination device 10. The planar illumination device 10 is not described since having a construction similar to the one shown in FIGS. 1 to 4.

The liquid crystal display panel 30 includes a polarizing plate 31, a glass plate 32, a liquid crystal 33, a color filter 34, a glass plate 35 and a polarizing plate 36.

In the liquid crystal display device 25 thus constructed, the irradiation light 23 emitted from the planar illumination device 10 passes through the polarizing plate 31 and the glass plate 32 of the liquid crystal display panel 30 to be modulated by the liquid crystal 33. The irradiation light 23 modulated by the liquid crystal 33 passes through the color filter 34, the glass plate 35 and the polarizing plate 36 to be displayed as an image of the liquid crystal display device 25.

Figure 6:
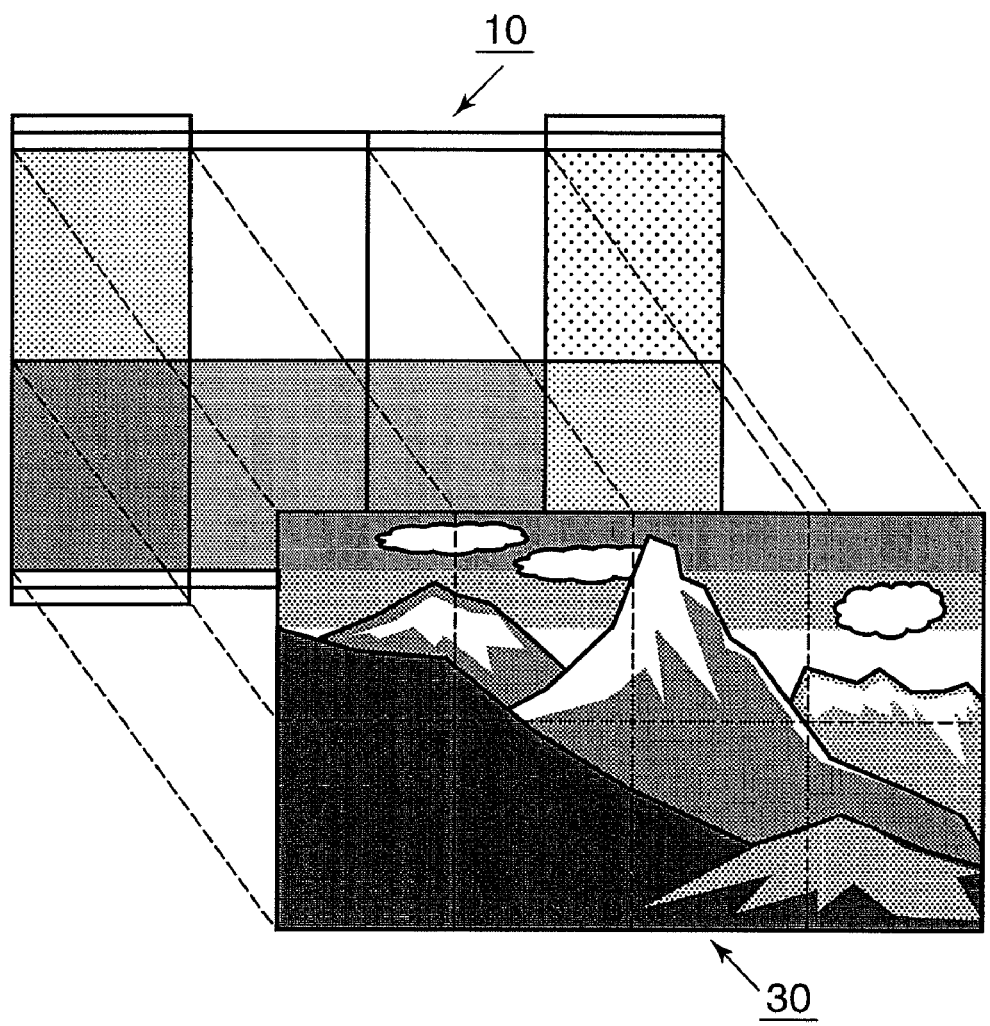
FIG. 6 is a schematic diagram showing a light quantity control of emission regions of the liquid crystal display device of FIG. 5.

Here, it is possible to divide an image displayed on the liquid crystal display device 25 into several regions as shown in FIG. 6 and to adjust the luminance of backlight (irradiation light 23 of the planar illumination device 10) corresponding to these regions in accordance with the luminance of the image in these regions.

Specifically, since the luminance of the image displayed in a left lower region is lowest in an example shown in FIG. 6, the luminance of the backlight in this region is set to be lowest. On the other hand, since the luminance of the image displayed in two middle regions at an upper stage is highest, the luminance of the backlight in these regions is set to be highest. Since the luminance of the backlight can be partially reduced according to the luminance of the image, power consumption can be reduced as compared with the case where the luminance of all the regions is set high in accordance with the highest luminance of the image.

According to the liquid crystal display device 25 using the planar illumination device 10 capable of adjusting the luminance for each of the multiple divided emission regions 27a to 27h as a backlight as described above, power consumption can be largely reduced and contrast is improved by performing local dimming for adjusting the luminance of the backlight for each region according to luminance information of each region of a video to be displayed as compared with the case where all the regions are constantly totally illuminated with white light.

Further, by independently luminance-adjusting the light quantities of RGB light beams emitted from the respective light sources 11R, 11G and 11B, power consumption can be more reduced than in the case of luminance-adjusting the respective regions with white light. Furthermore, a thin liquid crystal display device with wide color reproducibility and high quality can be realized by using laser light sources as the light sources 11 as in the above embodiment.

Although the areas of the light guide plate 21 and the liquid crystal display panel 30 are divided into eight regions in the above embodiment, the number of regions is not limited to eight and the above effects can be obtained by setting the partition number to 2 or more and 1000 or less for the following reason.

As the light guide plate 21 and the liquid crystal display panel 30 are divided into more regions (more emission regions), the luminance of each divided emission region can be more finely adjusted, wherefore the effect of reducing the power consumption is high. If a luminance adjustment is performed for each pixel, a finest luminance adjustment (local dimming) can be performed, but the power consumption reducing effect in this case is said to be about 60 to 70%. On the other hand, the effect of reducing 50% or more of the power consumption is reported even by a luminance adjustment (local dimming) in the case where the partition number is several hundreds. Accordingly, by dividing the emission area of the light guide plate 21 into 2 or more and 1000 or less regions, the power consumption reducing effect can be effectively achieved.

Figure 7:
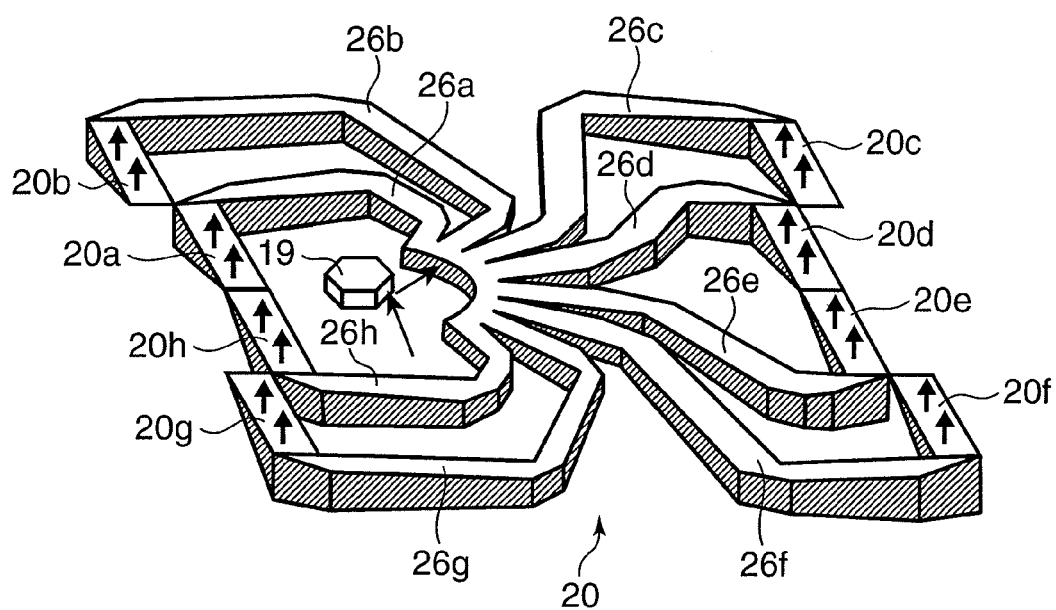
FIG. 7 is a perspective view showing a modification of a branched light guide in the planar illumination device of FIG. 1.

Although it is not intended to limit the shapes of the light guide paths 26a to 26h of the branched light guide 20, the light guide paths 26a to 26h preferably have such tapered shapes that cross-sectional areas thereof gradually increase in propagation directions of the scanned light as shown in FIG. 7.

Specifically, the respective light guide paths 26a to 26h shown in FIG. 7 are formed such that the thicknesses thereof gradually increase from the incident surface 20i toward the linear emitting portions 20a to 20h.

In this way, the light guide paths 26a to 26h have such tapered shapes that the cross-sectional areas thereof increase toward the linear emitting portions 20a to 20h. Thus, propagating light in the linear emitting portions 20a to 20h is totally reflected by the side surfaces of the light guide paths 26a to 26h while propagating in the light guide paths 26a to 26h, thereby having variations in the propagation directions made smaller and being more uniform. As a result, variations of the light emitted from the linear emitting portions 20a to 20h can also be made smaller, wherefore light utilization efficiency can be improved by increasing a ratio of the light to be totally reflected by the reflecting portions 21a to 21h to the light emitted from the linear emitting portions 20a to 20h.

Further, since light can be incident at a specified divergence angle on the light guide plate 21, the respective emission regions 27a to 27h can be made uniformly luminous.

Accordingly, it is possible to efficiently guide light to the incident portions of the light guide plate 21 and make the light guide plate 21 uniformly luminous by utilizing the branched light guide 20 shown in FIG. 7.

Although the cross-sectional areas of the respective light guide paths 26a to 26h are increased by gradually increasing the thicknesses in the branched light guide 20 shown in FIG. 7, they can be also increased by increasing the widths of the respective light guide paths 26a to 26h.

Although the light guide paths 26a to 26h are formed by a solid light guide (branched light guide 20) in this embodiment, they can be formed by a hollow light guide pipe having inner side surfaces capable of reflecting scanned light. With a solid light guide, light absorption by the light guide itself cannot be ignored in some cases if light guide paths become longer. However, if a light guide pipe is used, an efficiency loss caused by light absorption can be reduced.

Further, although the light guide paths 26a to 26h are arranged on the same plane in the planar illumination device 10 of this embodiment, the light guide paths 26a to 26h including the incident surface 20i may be arranged such that a plurality of light guide paths are placed one over another or a plurality of light guide paths cross in a three-dimensional manner.

Although the polygon mirror 19 is used to scan light to be incident on the branched light guide 20 in the above embodiment, the light guide paths 26a to 26h may be switched using a one-axis or two-axis MEMS (Micro Electro Mechanical Systems) mirror. If such a construction is employed, the scanning optical system can be miniaturized and a thinner planar illumination device can be realized.

Further, a mirror having one reflecting surface may be arranged as a scanning optical system while being inclined with respect to an optical axis and this mirror may be rotated about a rotary axis parallel to an incident direction (optical axis direction) of light, whereby light is scanned in a range of 360°. If such a construction is employed, a planar illumination device capable of luminance adjustment in multiple divided small ranges can be realized. This construction is described below.

Figure 8:
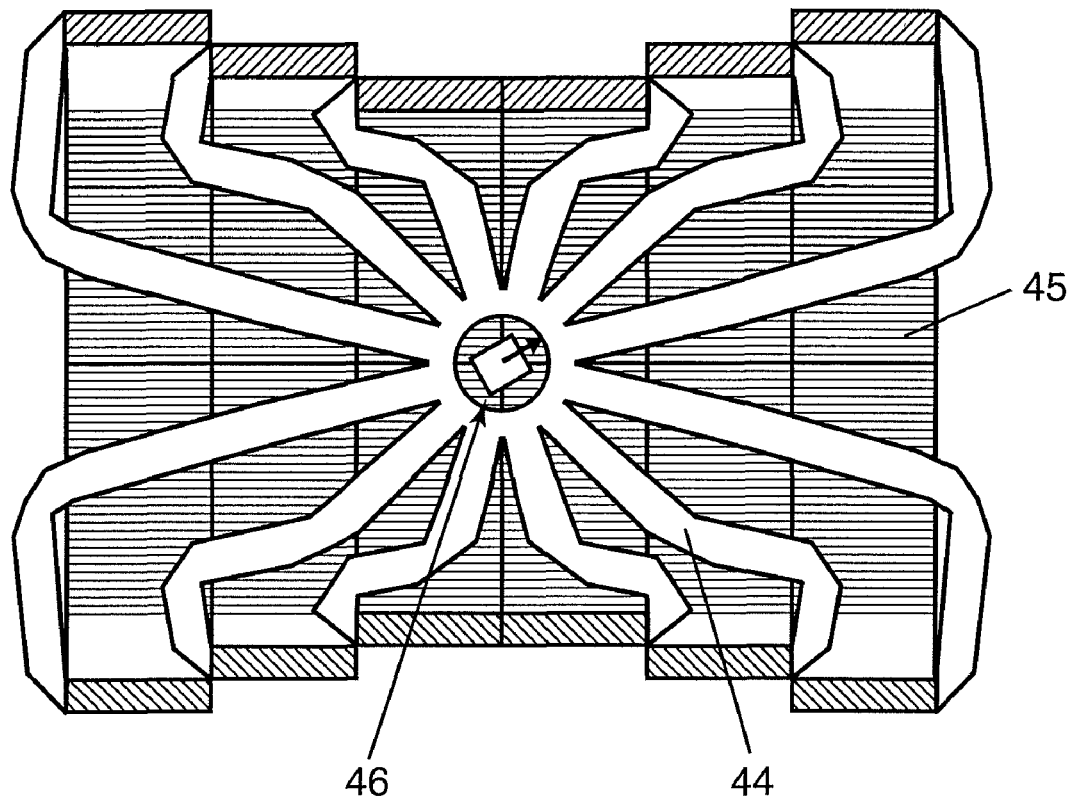
FIG. 8 is a schematic construction diagram of the planar illumination device mounted with a scanning optical system for light scanning in a range of 360° when viewed from behind.
Figure 9:
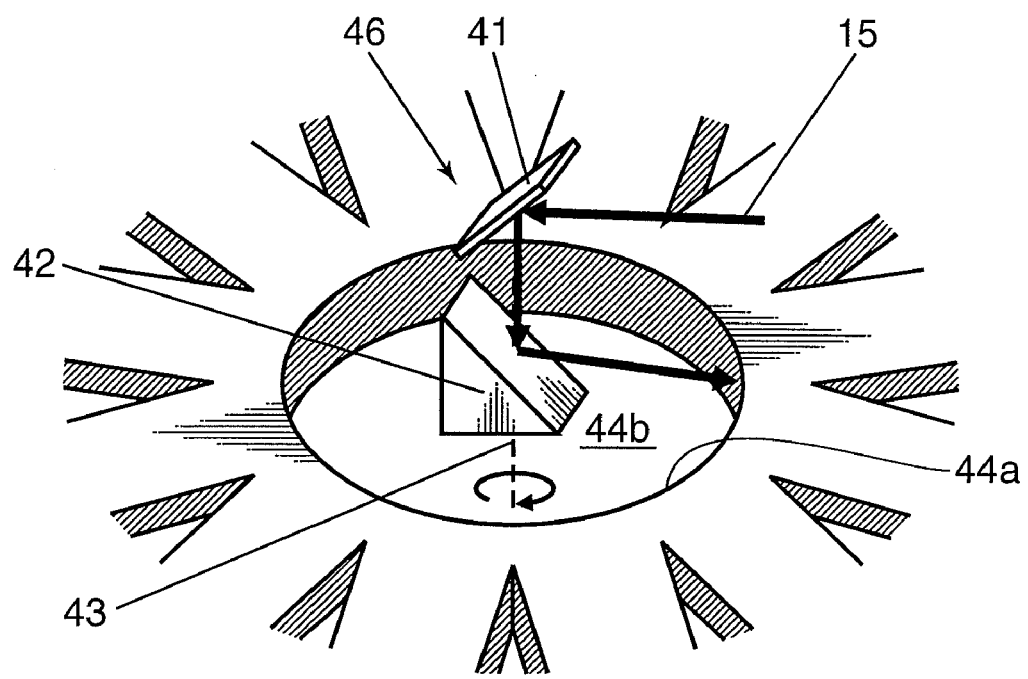
FIG. 9 is a perspective view enlargedly showing the scanning optical system of FIG. 8.

FIG. 8 is a schematic construction diagram of a planar illumination device 40 mounted with a scanning optical system 46 for scanned light in a range of 360° when viewed from behind. FIG. 9 is a perspective view enlargedly showing the scanning optical system of FIG. 8.

With reference to FIG. 8, the planar illumination device 40 is provided with a 360° scanning optical system 46, a branched light guide 44 and a light guide plate 45. Since basic structures of the branched light guide 44 and the light guide plate 45 are similar to those of the branched light guide 20 and the light guide plate 21 shown in FIGS. 1 to 4, they are not described here. The planar illumination device 40 differs from the planar illumination device 10 shown in FIGS. 1 to 4 in that an emission area is divided into twelve regions.

With reference to FIGS. 8 and 9, the scanning optical system 46 includes a mirror 41 and a rotating mirror 42 constructed to be rotatable about a rotary shaft 43.

The mirror 41 has a reflecting surface inclined at about 45° with respect to the rotary shaft 43. This mirror is fixed with respect to the light sources 11 (see FIG. 2). In this embodiment, the light sources 11 irradiate a laser beam 15 along an optical axis orthogonal to the rotary shaft 43 and inclined at about 45° with respect to the reflecting surface of the mirror 41 as shown in FIG. 9.

Similarly, the rotating mirror 42 has a reflecting surface inclined at 45° with respect to the rotary shaft 43. The rotating mirror 42 is so supported in a circular hole 44b formed in the branched light guide 44 as to be rotatable about the rotary shaft 43. In this embodiment, the inner side surface of the hole 44b of the branched light guide 44 functions as an incident portion 44a.

In the planar illumination device 40 thus constructed, the laser beam 15 is deflected in a direction parallel to an axial line of the rotary shaft 43 by the mirror 41, propagates along the rotary shaft 43 and is reflected in a direction orthogonal to the rotary shaft 43 by the rotating mirror 42.

By the rotation of the rotating mirror 42 about the rotary shaft 43, the laser beam 15 is scanned in the range of 360° with respect to the incident portion 44a of the branched light guide 44 and incident on the branched light guide 44.

Scanned light incident on the branched light guide 44 reaches a linear emitting portion via any one of twelve branched light guide paths according to a scanning position and is deflected toward the light guide plate 45 by the linear emitting portion to be incident on the light guide plate 45. Also in this embodiment, the twelve light guide paths of the light guide plate 45 are constructed such that scanned light in different scanning sections of the scanning range of 360° by the rotating mirror 42 are respectively incident thereon.

The scanned light incident on the light guide plate 45 is emitted from an emission region corresponding to the light guide path of the branched light guide 44 out of twelve emission regions set in a principal surface of the light guide plate 45.

According to this planar illumination device 40, the laser beam 15 is scanned to be incident on the incident portion 44a of the branched light guide 44 similar to the planar illumination device 10, whereby the respective emission regions set in the light guide plate 45 successively become luminous.

Further, according to the planar illumination device 40, power consumption can be reduced by performing local dimming by a combination with the liquid crystal display panel 30 (see FIG. 5) since luminance can be adjusted for each region similar to the planar illumination device 10.

Since the wide scanning range of 360° is set in the planar illumination device 40, the number of operational sections set by dividing this scanning range can be more easily increased, with the result that the power consumption reducing effect can be improved by increasing the number of the emission regions.

In the case of using the rotating mirror 42 as in the planar illumination device 40, an incident angle of incident light on the reflecting surface can be kept constant unlike in the case of using a polygon mirror. Thus, according to the planar illumination device 40, the influence of an incident angle characteristic on reflectance by the rotating mirror 42 can be reduced and a light quantity loss caused by an edge part of the polygon mirror is eliminated, wherefore light utilization efficiency can be improved.

The branched light guides 20, 44 and the linear emitting portions of the above planar illumination devices 10, 40 can also be formed using a photonic crystal in which materials with difference refractive indices are two-dimensionally periodically arranged.

This photonic crystal has a slab-like main body with a sufficiently small thickness as compared with a dimension in an in-plane direction. This main body has regions where different refractive index portions having a refractive index different from that of the main body are periodically arranged and defect regions partially destroying a periodic structure by increasing or decreasing the number of the different refractive index portions. In the regions where the different refractive index portions are periodically arranged, a photonic band gap is formed and light with energy in this range cannot be present. Thus, if light of a specified wavelength is incident on this photonic crystal, light is present only in and near the defect regions. Accordingly, by linearly forming these defect regions, a light guide path for light of the specific wavelength can be formed. Further, by forming the defect regions in a dotted manner, it is also possible to collect light, which cannot be present around, and extract the light in a direction perpendicular to a principal surface of the main body.

Figure 10:
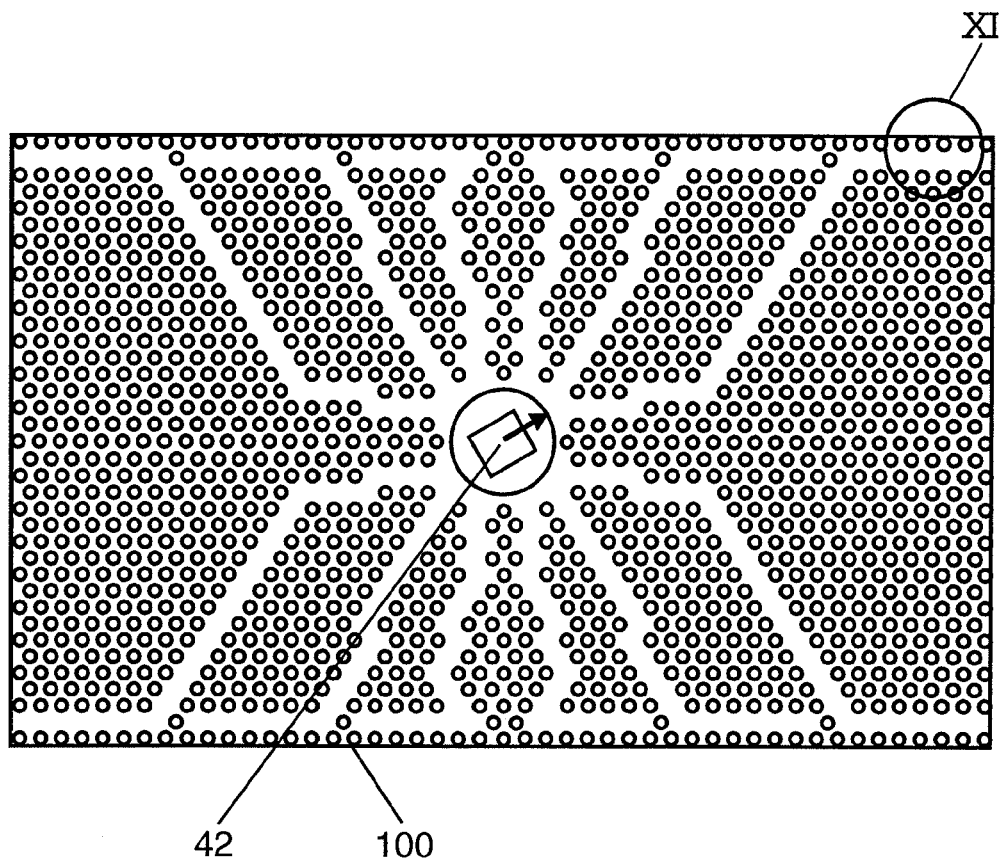
FIG. 10 is a schematic construction diagram of a two-dimensional photonic crystal having light guide paths when viewed from a light guide plate.
Figure 11:
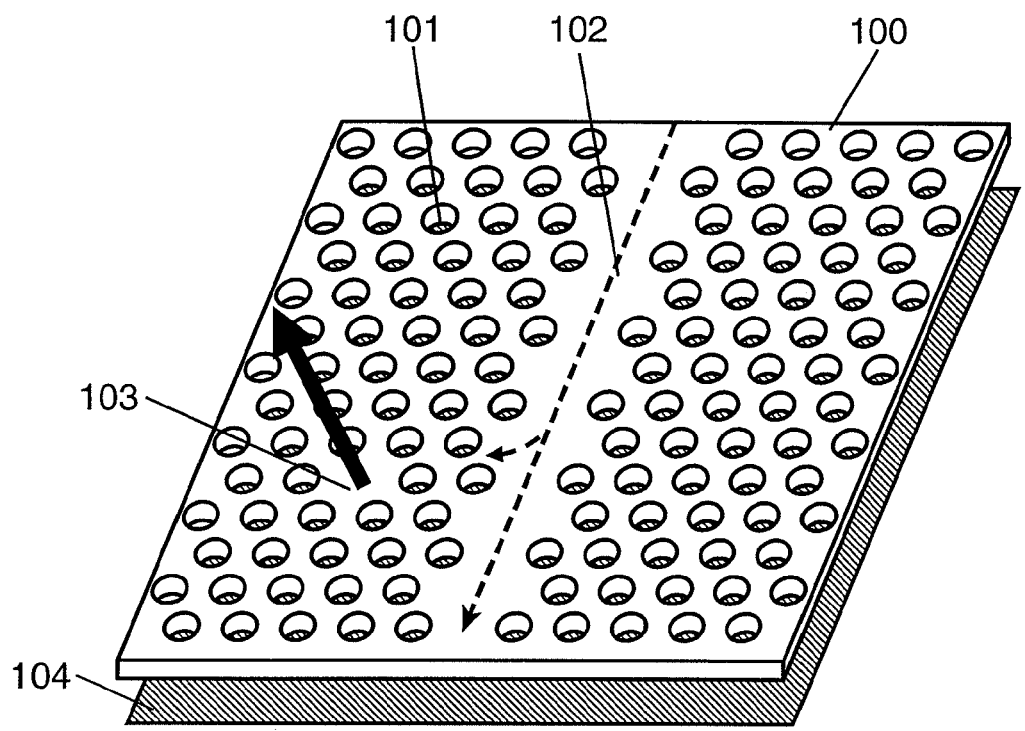
FIG. 11 is an enlarged perspective view of a part XI of FIG. 10.

FIG. 10 is a schematic construction diagram of a two-dimensional photonic crystal having light guide paths when viewed from a light guide plate, and FIG. 11 is an enlarged perspective view of a part XI of FIG. 10.

It is necessary to form a different light guide path for each wavelength of propagating light. Since different light guide paths are formed only by differentiating the period, only one light guide path is shown in FIG. 10.

In FIGS. 10 and 11, the two-dimensional photonic crystal is provided with a slab-like main body 100, air vents (different refractive index portions) 101 formed in the main body 100, linear defect light guide paths 102 formed in the main body 100, spot defect portions 103 formed in the main body 100 and a reflective sheet 104 arranged on the rear surface of the main body 100.

The main body 100 includes a core layer and cladding layers formed on upper and lower principal surfaces of this core layer. The core layer is, for example, made of silicon. The cladding layers are thin films having a lower refractive index than the core layer.

The air vents 101 are periodically arranged in a planar direction of the main body 100 and formed to penetrate the core layer in a thickness direction.

The linear defect light guide paths 102 are formed by adjusting a periodical structure of the air vents 101. Specifically, it is formed by linearly arranging defect parts of the main body 100 formed with no air vent 101.

The spot defect portions 103 are formed as parts formed with no air vent 101 similar to the linear defect light guide paths 102. Here, the spot defect portions 103 are arranged only at positions near the linear defect light guide paths 102 and a plurality of them are linearly arranged in conformity with incident portions of the light guide plate. Accordingly, light of a specific wavelength guided by the linear defect light guide path 102 is emitted toward the light guide plate as linear light via the spot defect portions 103 located near the linear defect light guide path 102. In other words, the spot defect portions 103 formed in the main body 100 constitute linear emitting portions.

If such a construction is employed, scanned light scanned in the range of 360° by the rotating mirror 42 and incident on the two-dimensional photonic crystal (main body 100) is branched for each incident scanning section and each wavelength and incident on the linear defect light guide path 102 corresponding to the scanning section and the wavelength.

The scanned light incident on the linear defect light guide path 102 reaches the linear emitting portion (spot defect portion 103) via any one of twelve light guide paths branched for the respective wavelengths according to the scanned position.

Here, a part of the scanned light guided along the linear defect light guide path 102 is emitted in a principal surface direction of the main body 100 via the spot defect portion 103 arranged near this linear defect light guide path 102 and corresponding to the linear emitting portion.

Out of the light emitted from the main body 100, light emitted toward the light guide plate is incident on the light guide plate and light emitted toward the rear surface of the main body 100 is also incident on the light guide plate by being reflected by the reflective sheet 104.

If the light guide paths using such a two-dimensional photonic crystal are used, a plurality of light guide paths can be formed by adjusting the formation mode of the air vents 101 in the slab-like main body 100. Therefore, a thinner planar illumination device with higher efficiency can be realized as compared with the case where a plurality of physical light guide paths are formed as in the above embodiment.

Second Embodiment

Figure 12:
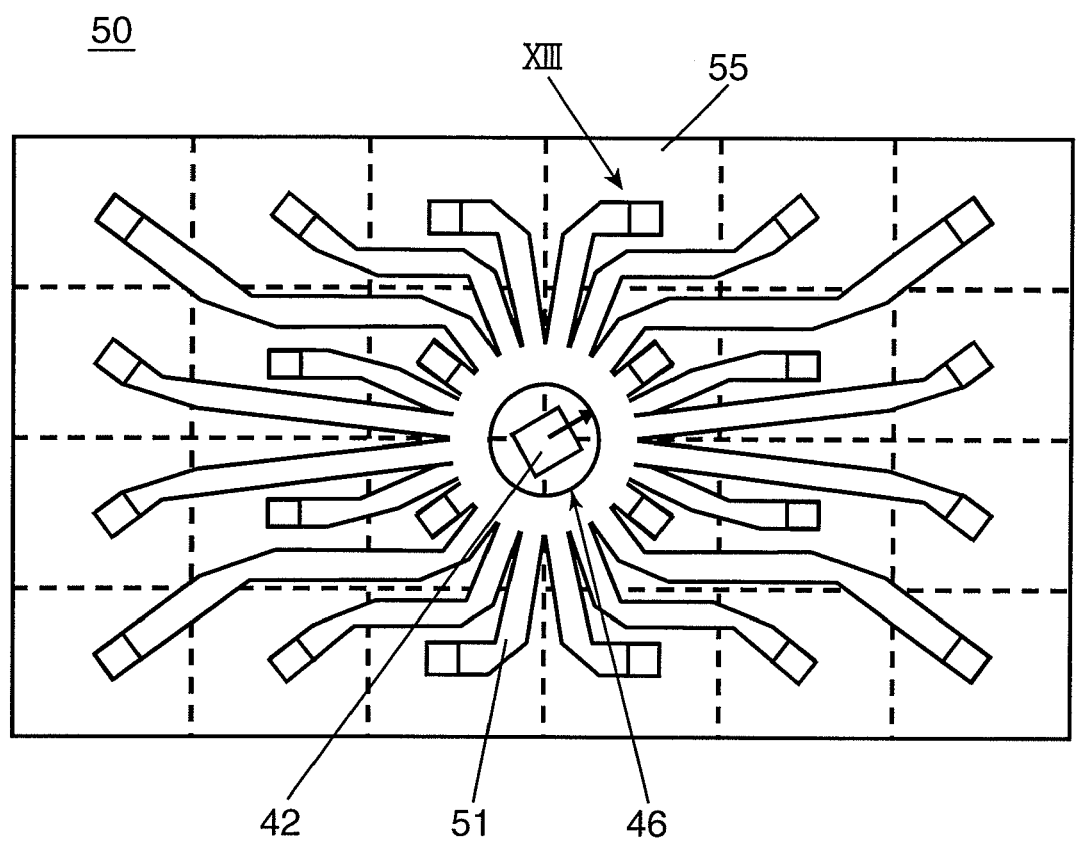
FIG. 12 is a schematic construction diagram of a planar illumination device according to a second embodiment of the invention when viewed from behind.
Figure 13:
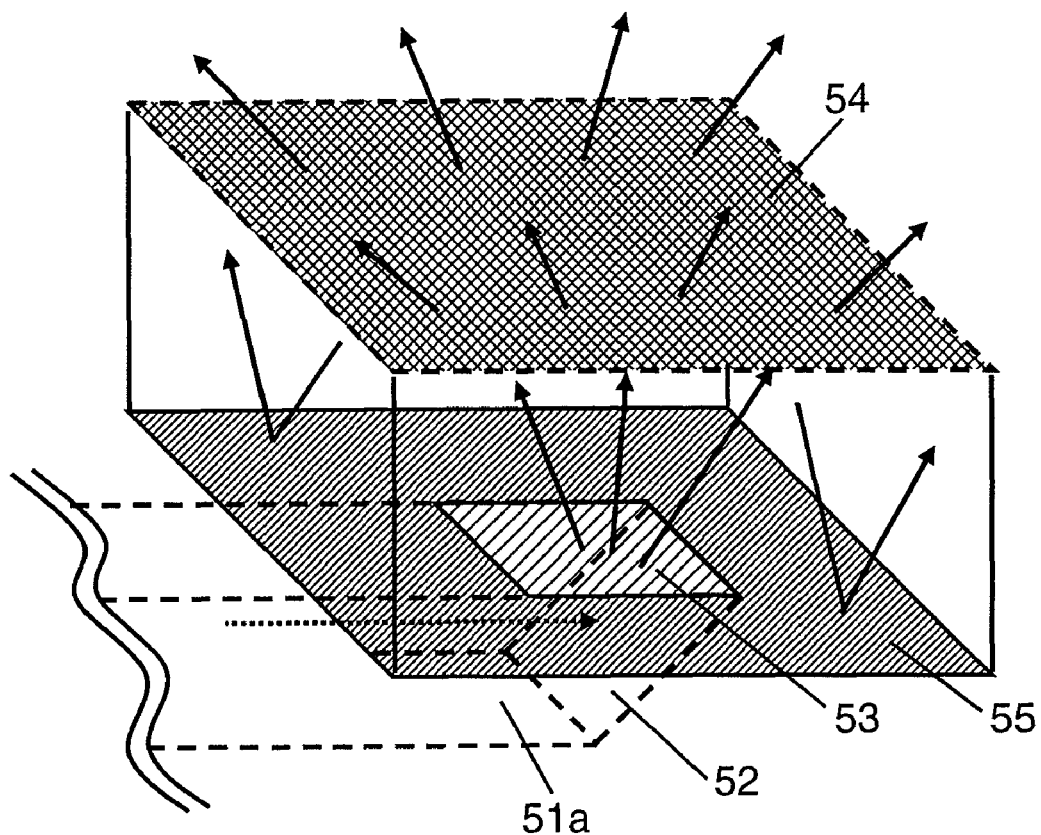
FIG. 13 is a perspective view of a light emitting portion located in a part XIII of FIG. 12.

FIG. 12 is a schematic construction diagram of a planar illumination device 50 according to a second embodiment of the invention when viewed from behind, and FIG. 13 is a perspective view of a light emitting portion 51a located in a part XIII of FIG. 12. In and with reference to FIGS. 12 and 13, a light source part is neither shown nor described since being the same as in the first embodiment.

With reference to FIG. 12, the planar illumination device 50 is provided with a scanning optical system 46 (see FIG. 9), a branched light guide 51, a diffusion sheet 54 and a reflective sheet 55. The scanning optical system 46 includes the rotating mirror 42 shown in FIG. 9.

The light guide plate 51 is formed such that light is emitted from emitting portions 51a at the leading ends of the respective branched light guide paths. Here, the emitting portions 51a of the respective light guide paths shown in FIG. 12 all have a construction similar to the one shown in FIG. 13.

Specifically, the emitting portion 51a has an inclined surface 52 inclined substantially at 45° with respect to a thickness direction of the light guide path and a diffusing surface 53 for diffusing light reflected by this inclined surface 52 and emitting the diffused light.

For example, reflection coating is applied to the inclined surface 52 of the emitting portion 51a so as to totally reflect propagating light.

The reflective sheet 55 has openings formed in ranges facing central positions of emission regions set in the diffusion sheet 54. Light emitted from the diffusing surface 53 of the light guide path is guided to the diffusion sheet 54 via the opening of the reflective sheet 55.

The diffusion sheet 54 transmits a part of light emitted from the diffusing surface 53 of the light guide path while diffusing it, and reflects the remaining part.

Specifically, one principal surface of the diffusion sheet 54 facing the emitting portion 51a of the branched light guide 51 partially transmits and partially reflects the light from the light guide path. The diffusion of the light from the light guide path is realized by a refractive index distribution in the diffusion sheet 54 or a convexo-concave pattern formed on a principal surface of the diffusion sheet 54 opposite to the branched light guide 51.

In the planar illumination device 50 thus constructed, a laser beam emitted from light sources is reflected and scanned in the range of 360° by the rotating mirror 42 to be incident on the branched light guide 51.

The scanned light incident on the branched light guide 51 reaches the emitting portion 51a via any one of 24 branched light guide paths according to the scanned position. The light having reached the emitting portion 51a is emitted from the branched light guide 51 to reach the diffusion sheet 54 after being deflected by the inclined surface 52 and diffused by the diffusing surface 53.

The light having passed through the principal surface of the diffusion sheet 54 toward the branched light guide 51 is emitted from the diffusion sheet 54 after being further diffused. On the other hand, the light reflected by the principal surface of the diffusion sheet 54 toward the branched light guide 51 is repeatedly reflected between the diffusion sheet 54 and the reflective sheet 55 and consequently emitted form the diffusion sheet 54 after being diffused. In this way, uniform light is diffused and emitted from a plurality of emission regions set in the diffusion sheet 54.

Since this planar illumination device 50 is dotted with the emitting portions of the branched light guide 51 in the same plane, the respective emission regions of the diffusion sheet 54 successively become luminous by scanning the incident light on the branched light guide 51.

Here, planar illumination with high uniformity can be realized if light emitted from the light sources is kept constant. Further, if emission light quantities are controlled by light source controllers in conformity with emission timings of the respective emission regions of the diffusion sheet 54, luminance and emission color can be changed for each illumination region. Thus, similar to the first embodiment, it is possible to perform local dimming by a combination with the liquid crystal display panel 30 and a low power consuming and high contrast liquid crystal display device can be realized.

Further, since direct illumination using no light guide plate is adopted in this construction, light utilization efficiency can be more improved than in the construction of the first embodiment.

If a lattice-shaped inner wall defining the respective emission regions is provided between the diffusion sheet 54 and the reflective sheet 55 in this embodiment, light guided to each emission region by the light guide path does not leak into an adjacent illumination region, wherefore local dimming with good contrast can be realized.

Third Embodiment

Figure 14:
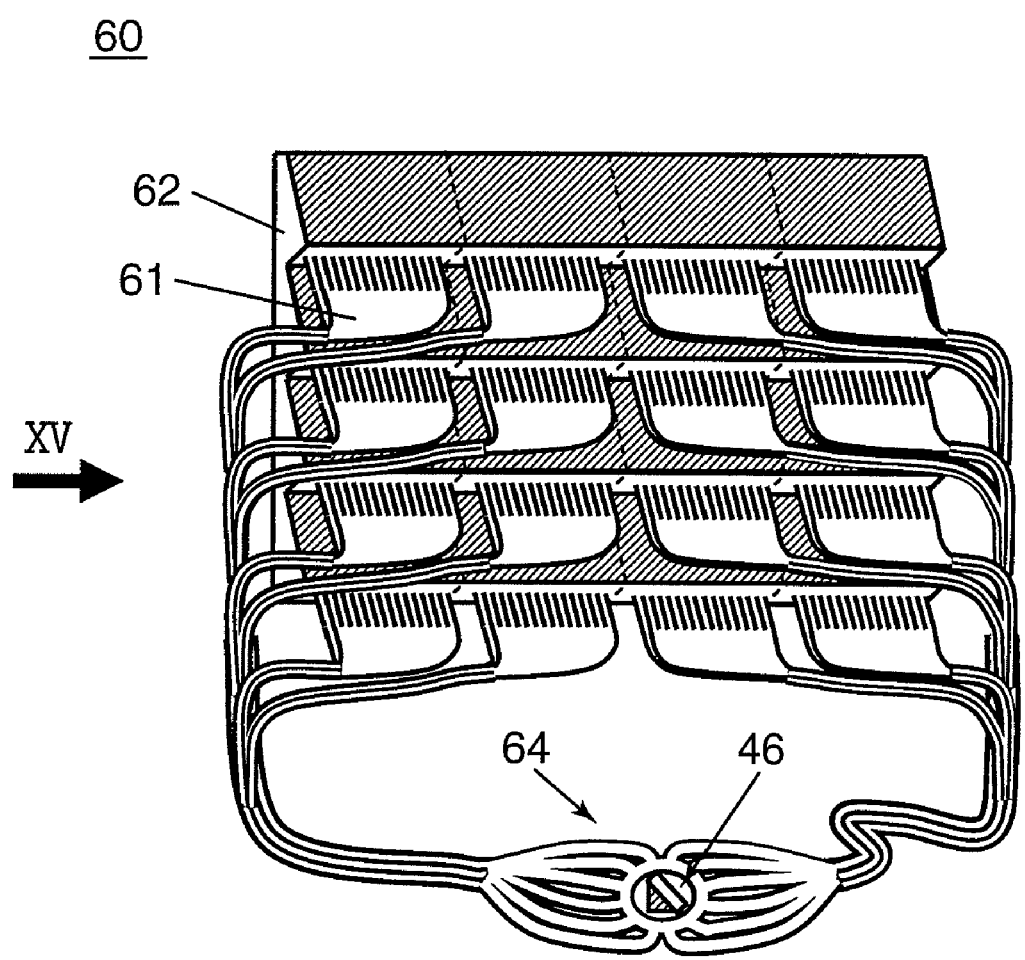
FIG. 14 is a schematic construction diagram of a planar illumination device according to a third embodiment of the invention when viewed from behind.
Figure 15:
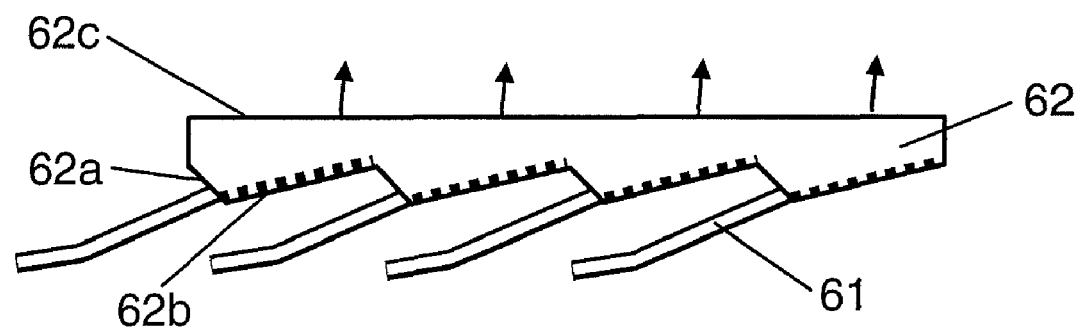
FIG. 15 is a side view when viewed in a direction XV of FIG. 14.
Figure 16:
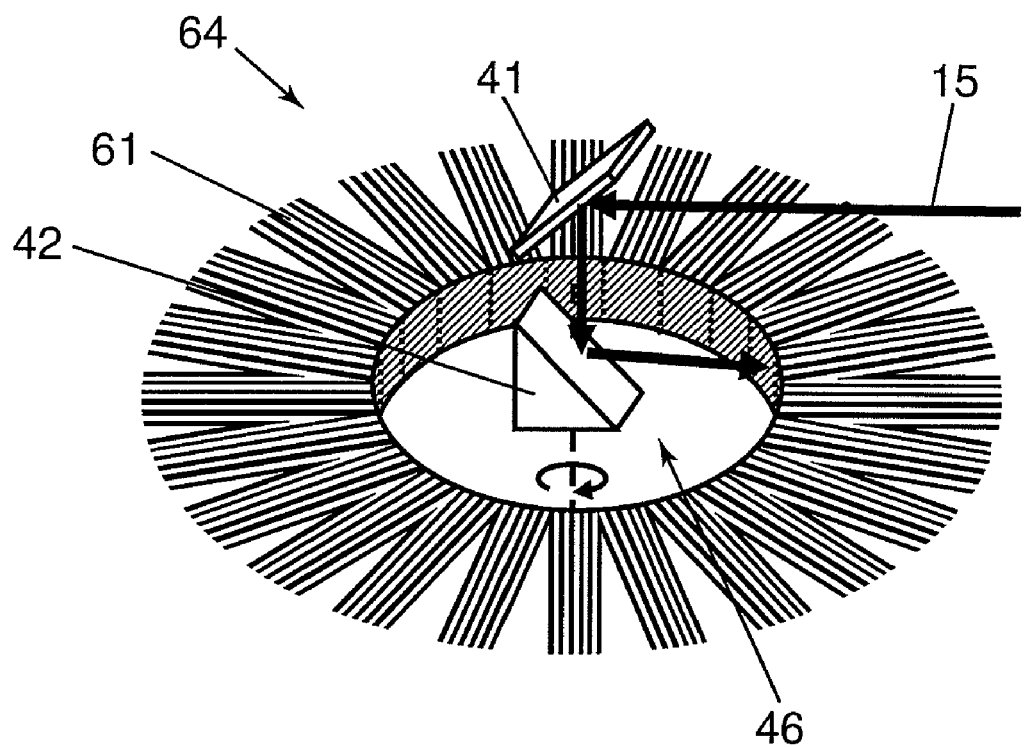
FIG. 16 is a perspective view of a part identified by reference numeral 64 in FIG. 14.

FIG. 14 is a schematic construction diagram of a planar illumination device 60 according to a third embodiment of the invention when viewed from behind, FIG. 15 is a side view when viewed in a direction XV of FIG. 14, and FIG. 16 is a perspective view of a part identified by reference numeral 64 in FIG. 14. In FIG. 16, the same constituent elements as in the first embodiment are identified by the same reference numerals and not described. Further, a light source part is not shown since being the same as in the first embodiment.

With reference to FIGS. 14 and 15, the planar illumination device 60 is provided with a scanning optical system 46, optical fiber bundles 61 and a light guide plate 62, on which light emitted from optical fiber bundles 61 is incident.

Each optical fiber bundle 61 includes a plurality of optical fibers arranged such that emitting ends as one ends thereof are linearly arranged.

The light guide plate 62 includes an emitting surface 62c having a plurality of emission regions set therein, and incident surfaces 62a and deflecting portions 62b alternately arranged on a surface opposite to the emitting surface 62c. Light incident on the incident surface 62a of the light guide plate 62 is deflected by the deflecting portions 62b to be emitted from the emitting surface 62c.

More specifically, a plurality of mountain-shaped projections extending in a specified direction are formed on the surface of the light guide plate 62 opposite to the emitting surface 62c, the incident surfaces 62a are formed on slants facing in a specified direction out of slants forming the mountain-shaped projections and the deflecting portions 62b are formed on slants facing in an opposite direction.

The linearly arranged emitting end of the optical fiber bundle 61 is optically bonded to each incident surface 62a. Further, deflecting grooves for deflecting the light incident on the incident surface 62a toward the emitting surface 62c are formed in each deflecting portion 62b.

The optical fiber bundles 61 connected with the respective emission regions of the light guide plate 62 are bundled for the respective corresponding emission regions. The incident ends of the plurality of optical fiber bundles bundled for the respective emission regions are arranged around a rotating mirror 42 as shown in FIG. 16.

Specifically, a scanning range of 360° of the rotating mirror 42 is divided into a plurality of scanning sections, and the respective optical fiber bundles 61 are provided around the rotating mirror 42 such that the incident ends of the optical fiber bundles connected with the specific emission regions are arranged in the respective scanning sections. Accordingly, the optical fiber bundles 61, on which scanned light is incident, can be successively switched according to the scanning sections of the rotating mirror 42.

In the planar illumination device 60 thus constructed, a laser beam 15 is scanned in the range of 360° by being deflected by a mirror 41 and reflected by the rotating mirror 42, and incident on the optical fiber bundles 61 bundled for the respective emission regions of the light guide plate 62.

The scanned light incident on the optical fiber bundle 61 is incident on the incident surface 62a of the light guide plate 62 via any one of the optical fiber bundles according to the scanned position of the rotating mirror 42.

The light incident on the light guide plate 62 is deflected by the deflecting portion 62b and emitted from the emitting surface 62c. At this time, since the optical fiber bundles 61, on which the scanned light is incident, can be switched according to the scanning sections of the rotating mirror 42, the emission regions corresponding to the optical fiber bundles can successively become luminous.

Here, planar illumination with high uniformity can be realized if light emitted from the light sources is kept constant. Further, if emission light quantities are controlled by light source controllers in conformity with emission timings of the respective emission regions of the light guide plate 62, luminance and emission color can be changed for each illumination region. Thus, similar to the first embodiment, it is possible to perform local dimming by a combination with the liquid crystal display panel 30 and a low power consuming and high contrast liquid crystal display device can be realized.

Further, since light is guided to the respective regions of the light guide plate using the optical fibers in this construction, it is also possible to arrange the scanning optical system at a position other than the one on the rear surface of the light guide plate and very thin planar illumination device and liquid crystal display device can be realized.

Although a plurality of emission regions are set in one light guide plate in this embodiment, light guide plates may be individually provided for the respective emission regions.

Further, although the end faces of the emitting ends of the respective optical fibers constituting the optical fiber bundles are respectively connected with the light guide plate in this embodiment, it is also possible to utilize principal surfaces of fiber sheets each made up of a plurality of optical fibers as emission regions. In other words, light may be emitted from the principal surfaces of the fiber sheets in each of which a plurality of optical fibers are arranged in a sheet-like manner so that axial lines thereof are parallel to each other, i.e. from side surfaces of the respective optical fibers, and the principal surfaces of the fiber sheets may be utilized as the emission regions. This construction is described below.

Figure 17:
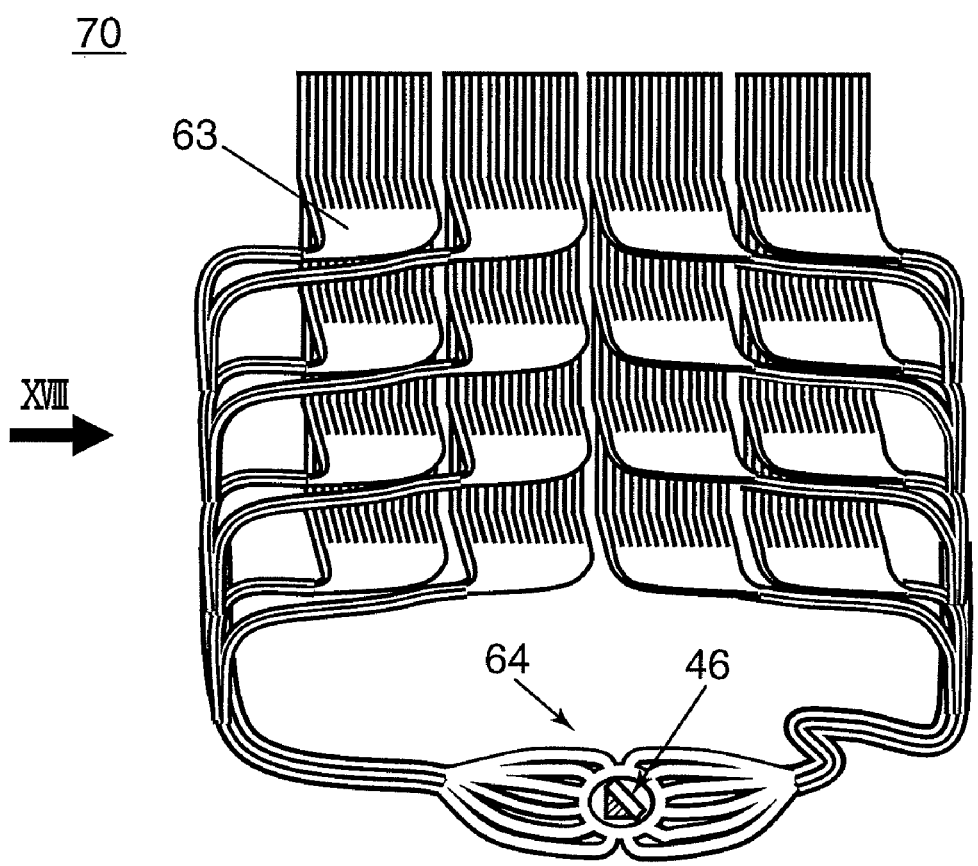
FIG. 17 is a schematic construction diagram of a planar illumination device in which emitting ends of optical fiber bundles have sheet-like shapes.
Figure 18:
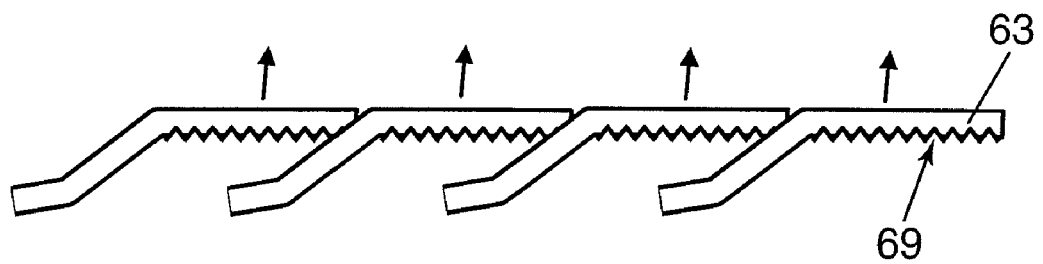
FIG. 18 is a side view of the planar illumination device when viewed in a direction XVIII of FIG. 17.
Figure 19:
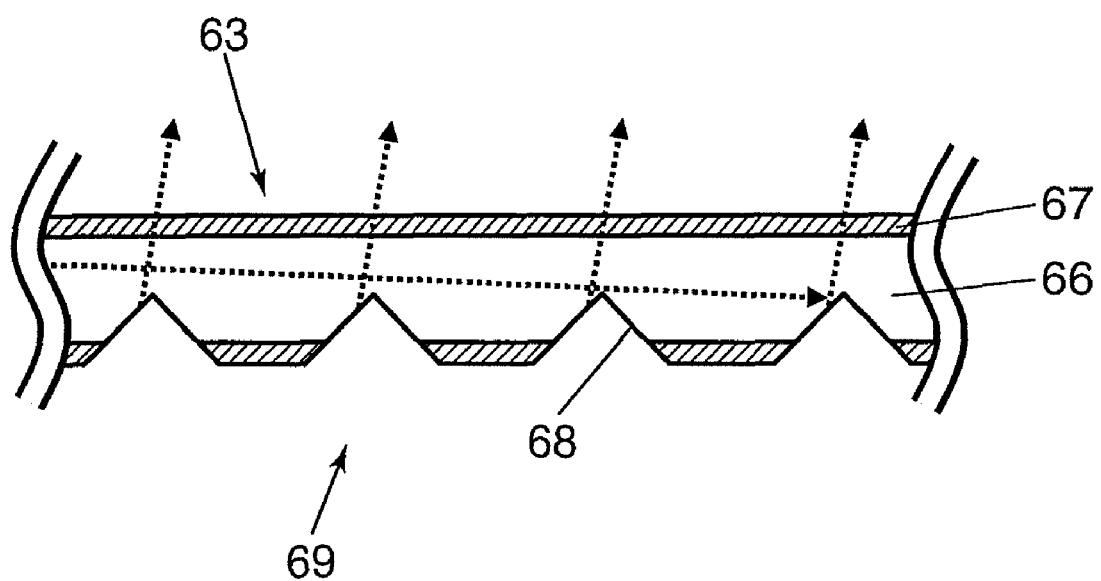
FIG. 19 is an enlarged view of a part identified by reference numeral 69 in FIG. 18.

FIG. 17 is a schematic construction diagram of a planar illumination device 70 in which emitting ends of optical fiber bundles are arranged in a sheet-like manner, FIG. 18 is a side view of the planar illumination device 70 when viewed in a direction XVIII of FIG. 17, and FIG. 19 is an enlarged view of a part identified by reference numeral 69 in FIG. 18. It should be noted that broken line indicates light propagating in the optical fibers.

In FIGS. 17 to 19, the planar illumination device 70 is provided with a scanning optical system 46 and optical fiber bundles 63.

Each optical fiber bundle 63 is made up of a plurality of optical fibers and an emitting end thereof is processed into a fiber sheet. Specifically, the fiber sheet is formed by arranging the emitting ends of the respective optical fibers such that the axial lines thereof are parallel to each other.

This fiber sheet is so formed as to emit light in a direction orthogonal to a plane including the axial lines of the respective optical fibers. In the following description, surfaces of the respective optical fibers located at a light emitting side are called as an emitting surface of the fiber sheet.

As shown in FIG. 19, wedge-shaped grooves 68 are formed in a core 66 and a cladding 67 located at a side of the fiber sheet opposite to the emitting surface. Light propagating in the fiber sheet is deflected toward the emitting surface of the fiber sheet by the wedge-shaped grooves.

In this embodiment, the emitting surface of the fiber sheet is utilized as an emission region without providing any light guide plate unlike the above embodiments. In other words, the planar illumination device 70 having a plurality of emission regions as a whole is constructed by arranging the fiber sheets on the same plane.

According to the construction using the fiber sheets instead of the light guide plate as described above, the planar illumination device can be further thinned as compared with the above embodiments and a connection loss from the fibers to the light guide plate is eliminated to improve light utilization efficiency.

Although the rotating mirror 42 is used as the scanning optical system 46 in the above embodiments, it is also possible to add a polarization separating function or a wavelength separating function using a polarization beam splitter or a dichroic mirror. Specific constructions with these functions are described below.

Figure 20:
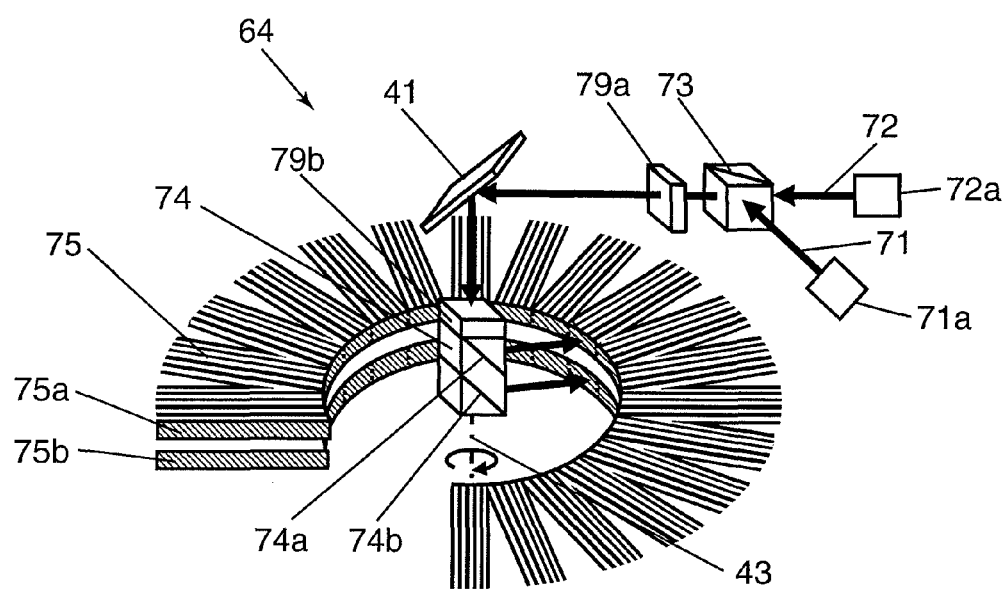
FIG. 20 is a view, equivalent to FIG. 16, showing a scanning optical system including a compound prism for polarizing and separating two laser beams having different polarization directions.

FIG. 20 is a view, equivalent to FIG. 16, showing a scanning optical system including a compound prism capable of polarization separation into two laser beams having different polarization directions.

With reference to FIG. 20, a planar illumination device according to this embodiment is provided with a laser light source 71a, a laser light source 72a, a polarization beam splitter 73, a quarter wave plate 79a, the mirror 41, a quarter wave plate 79b, a compound prism 74 and two-layer optical fiber 75.

The laser light source 71a emits an S-polarized laser beam 71 in such a state that the light quantity thereof can be controlled.

The laser light source 72a emits a P-polarized laser beam 72 in such a state that the light quantity thereof can be controlled.

The polarization beam splitter 73 transmits the P-polarized laser beam 72 while reflecting the S-polarized laser beam 71.

The quarter wave plate 79a converts the laser beam 71 into a clockwise circularly polarized beam and converts the laser beam 72 into a counterclockwise circularly polarized beam.

The quarter wave plate 79b returns the clockwise circularly polarized beam into the S-polarized beam and returns the counterclockwise circularly polarized beam into the P-polarized beam.

The compound prism 74 has a polarization beam splitting surface 74a and a reflecting surface 74b. The quarter wave plate 79b is integrally provided on an incident end surface of this compound prism 74. This compound prism 74 is formed to be rotatable about a rotary shaft 43 together with the quarter wave plate 79b.

The two-layer optical fiber 75 includes optical fiber bundles 75a and optical fiber bundles 75b, and light is guided to different emission regions of a light guide plate via these optical fiber bundles 75a, 75b.

In such a construction, the laser beams 71, 72 emitted from the laser light sources 71a, 72a are combined by the polarization beam splitter 73 and guided to the mirror 41 via the quarter wave plate 79a.

The laser beams 71, 72 reflected by the mirror 41 is guided to the compound prism 74 via the quarter wave plate 79b and have the polarizations thereof separated by the compound prism 74 while being rotationally scanned.

The scanned laser beam 71 is incident on the optical fiber bundles 75a. On the other hand, the scanned laser beam 72 is incident on the optical fiber bundles 75b. The laser beams 71, 72 incident on the optical fiber bundles 75a, 75b are respectively guided to different emission regions of the light guide plate.

Since two scanning ranges of 360° by the scanning optical system can be set in the embodiment shown in FIG. 20 as described above, luminance adjustments can be made for the more finely divided emission regions by respectively guiding the laser beams 71, 72 to the different emission regions.

The present invention aims to control the light quantity of the light source in conformity with illumination timings by finely dividing an emission area of a planar illumination device and time sharing light of the light source to successively illuminate the respective emission regions.

Here, illumination time for each divided emission region becomes shorter as the partition number increases, and the light quantity of the light source needs to be controlled at high speed. However, since there is a limit to the speed of the light quantity control, the partition number is restricted according to the limit in the speed of the light quantity control if the number of light sources is fixed. Therefore, the number of light sources needs to be increased in order to execute the control while more finely dividing the illumination area.

Here, in the case of increasing the number of light sources, the laser beams 71, 72 emitted from two independent light sources 71a, 72a can be scanned by one scanning optical system, for example, if the scanning optical system is constructed as shown in FIG. 20. Thus, the speed of the light quantity control can be increased even without adding a new scanning optical system and the enlargement and cost increase of the device can be suppressed.

Further, in the case of using an SHG light source as the G light source, a maximum partition number of the illumination area is restricted by a response speed of the G light source if the number of emission regions is fixed for all of the R light source, G light source and B light source since the response speed of the G light source in the light quantity control is slower than those of the R light source and B light source. Accordingly, by increasing the number of modulations of the R light source and B light source during one period of scanning by the scanning optical system over that of the G light source, the partition number of the emission regions for the R light source and B light source can be increased over that for the G light source, wherefore power consumption can be reduced as compared with the case where local dimming is performed with the same number of divided emission regions set for all of the RGB light sources.

Alternatively, by increasing the number of independently modulatable G light sources over those of independently modulatable R light sources and B light sources, it is also possible to improve the effect of local dimming by increasing the partition number of the emission regions for all of the RGB light. In this case, at least one scanning optical system for the R and B light sources and at least two scanning optical systems for the G light sources are normally necessary. The number of the scanning optical systems can be reduced by using a construction as shown in FIG. 20.

As a method for decreasing or maintaining the number of the scanning optical systems while increasing the number of independently modulatable light sources, laser beams may be incident in two directions using a polygon mirror as a scanning optical system.

Figure 21:
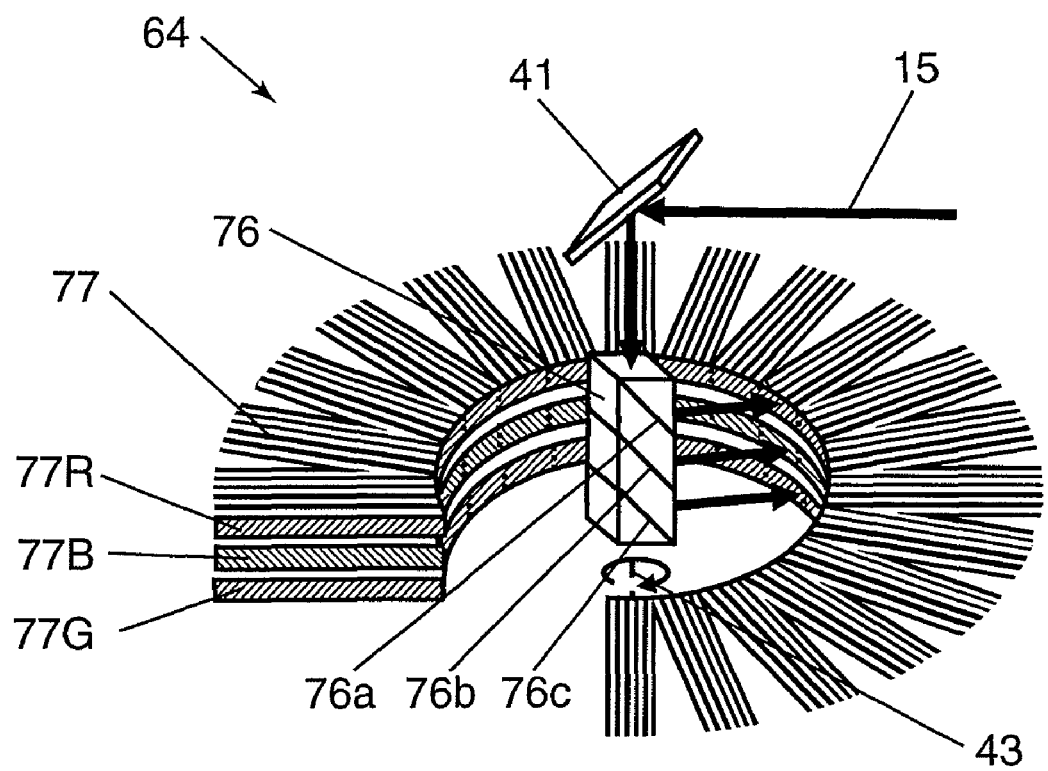
FIG. 21 is a view, equivalent to FIG. 16, showing a scanning optical system including a compound prism having a wavelength converting function.

It is also possible to use a compound prism having a wavelength separating function as shown in FIG. 21 as a scanning optical system. FIG. 21 is a view, equivalent to FIG. 16, showing a scanning optical system including a compound prism having a wavelength converting function.

With reference to FIG. 21, the scanning optical system of a planar illumination device according to this embodiment differs from the scanning optical system 46 shown in FIG. 16 in including a compound prism 76 and three-layer optical fiber bundles 77.

The compound prism 76 includes an R light reflecting surface 76a, a B light reflecting surface 76b and a reflecting surface 76c and has a RGB separating function. The compound prism 76 is supported rotatably about a rotary axis 43.

The three-layer optical fiber bundles 77 include optical fiber bundles 77R, optical fiber bundles 77G and optical fiber bundles 77B. These three-layer optical fiber bundles are substantially similar to the optical fiber bundles 63 shown in FIGS. 17 to 19, but differ therefrom in the following points.

Specifically, the optical fiber bundles 77R are for transmitting R light. Incident ends of the optical fiber bundles 77R are arranged around the compound prism 76 as shown in FIG. 20. Each optical fiber bundle 77R is made up of a plurality of optical fibers bundled for a corresponding scanning section of the compound prism 76.

The optical fiber bundles 77B are for transmitting B light. Incident ends of the optical fiber bundles 77B are arranged around the compound prism 76 and below the optical fiber bundles 77R. Each optical fiber bundle 77B is made up of a plurality of optical fibers bundled for a corresponding scanning section of the compound prism 76.

The optical fiber bundles 77G are for transmitting G light. Incident ends of the optical fiber bundles 77G are arranged around the compound prism 76 and below the optical fiber bundles 77B. Each optical fiber bundle 77G is made up of a plurality of optical fibers bundled for a corresponding scanning section of the compound prism 76.

Figure 22:
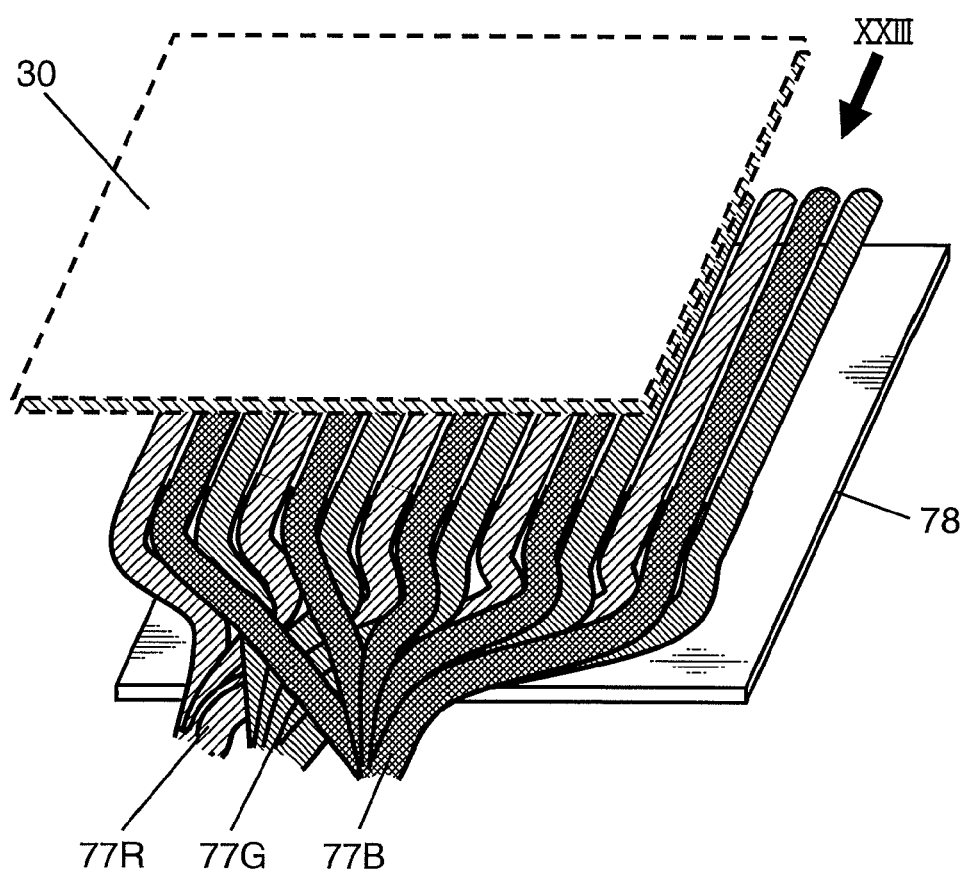
FIG. 22 is a perspective view enlargedly showing emitting ends of optical fiber bundles of FIG. 21.

An emitting end of the three-layer optical fiber bundle 77 is in the form of a fiber sheet as shown in FIG. 22. Specifically, FIG. 22 shows the optical fiber bundles 77R, 77G and 77B located at the same scanning section of the compound prism 76.

Emitting ends of a plurality of optical fibers constituting these optical fiber bundles 77R, 77G and 77B are arranged such that the axial lines thereof are parallel to each other, and these optical fibers are held on a sheet member 78 to form the fiber sheet as a whole. The color order and intervals of the respective optical fibers correspond to the color order and intervals of subpixels of the liquid crystal display panel 30. This is described below.

Figure 23:
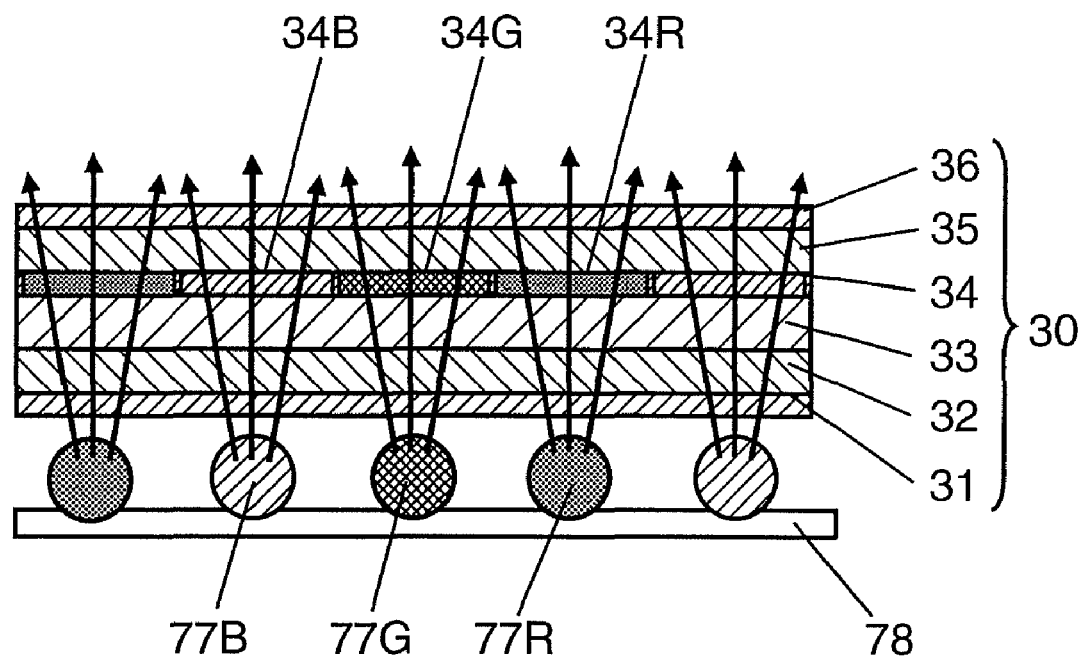
FIG. 23 is a side view when viewed in a direction XXIII of FIG. 22.

FIG. 23 is a side view when viewed in a direction XXIII of FIG. 22. FIG. 23 shows a section of the liquid crystal display panel 30 so that intervals of subpixels can be seen.

With reference to FIG. 23, the liquid crystal display panel 30 includes color filters 34R for transmitting R light (hereinafter, "R light transmitting CFs"), color filters 34G for transmitting G light (hereinafter, "G light transmitting CFs") and color filters 34B for transmitting B light (hereinafter, "B light transmitting CFs").

In this embodiment, the optical fibers constituting the optical fiber bundles 77R for emitting R light are arranged right below the R light transmitting CFs 34R, the optical fibers constituting the optical fiber bundles 77G for emitting G light are arranged right below the G light transmitting CFs 34G and the optical fibers constituting the optical fiber bundles 77B for emitting B light are arranged right below the B light transmitting CFs 34B.

In this construction, a laser beam 15 obtained by combining RGB light is separated into R light, G light and B light and rotationally scanned by the compound prism 76. Out of the scanned light, the R light is incident on the optical fiber bundles 77R, the B light is incident on the optical fiber bundles 77B and the G light is incident on the optical fiber bundles 77G.

The light incident on the respective optical fiber bundles 77R, 77G and 77B is guided to the fiber sheet as the emitting ends of the respective optical fiber bundles 77R, 77G and 77B, whereby the R light, B light and G light are emitted from the respective optical fibers.

Accordingly, if the above construction is employed, the light emitted from the respective optical fibers can be efficiently utilized since the respective optical fibers are so arranged as to correspond to the color filters for transmitting the RGB light.

In the case of using optical fibers as light guide paths, the thickness of a backlight is not largely increased even if the light guide paths are three-dimensionally crossed. Thus, an order in which emission regions successively become luminous can be freely set without changing the thickness.

Accordingly, in the construction for separating RGB light and guiding it to an illumination unit as shown in FIGS. 21 to 23, it is also possible to individually set an emission order of R light, G light and B light and emit R light, G light and B light with time lags in one emission region. If such a construction is employed, high light utilization efficiency can be realized since a combination with field sequential drive of a liquid crystal panel is possible.

Although light from the light sources is scanned in the embodiments shown in FIGS. 14 to 16 and FIGS. 17 to 19, luminance may be individually adjusted by setting the partition number of the illumination area equal to the number of the light sources to be modulated. In this case, LED elements may be used as the light sources since many light sources with low output may be used.

Figure 24:
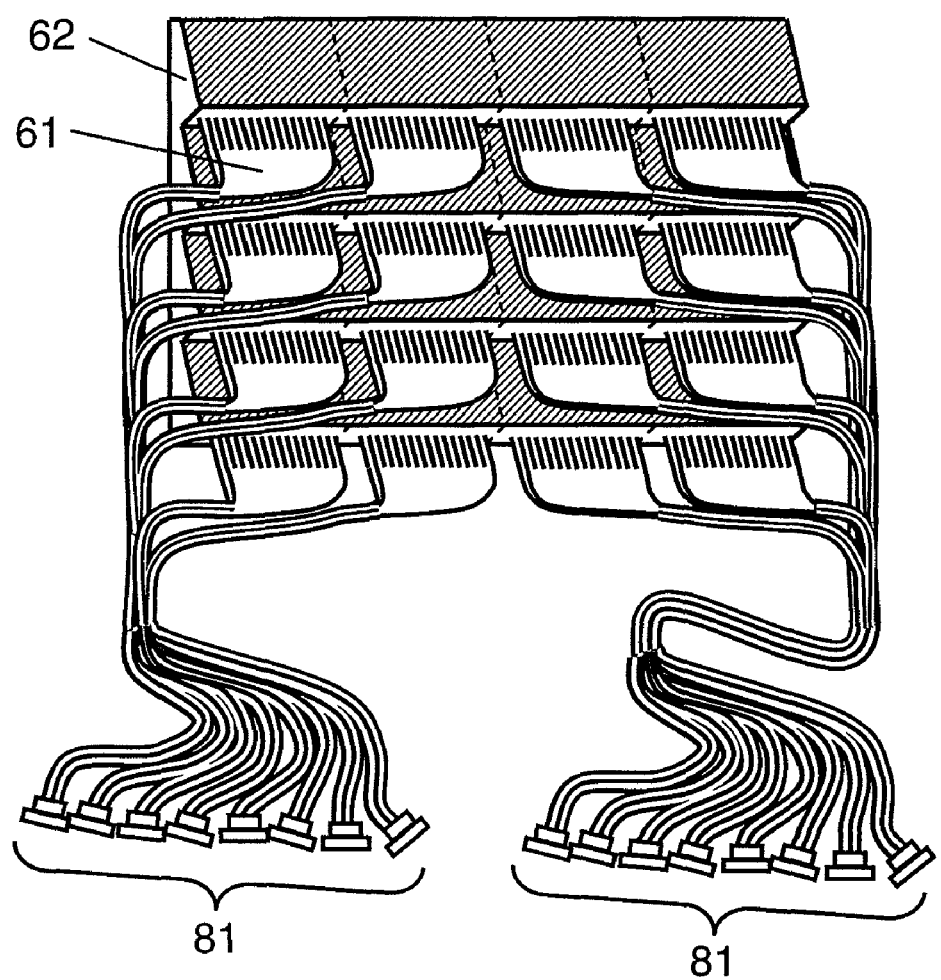
FIG. 24 is a schematic diagram showing a planar illumination device using LED elements as light sources.
Figure 25:
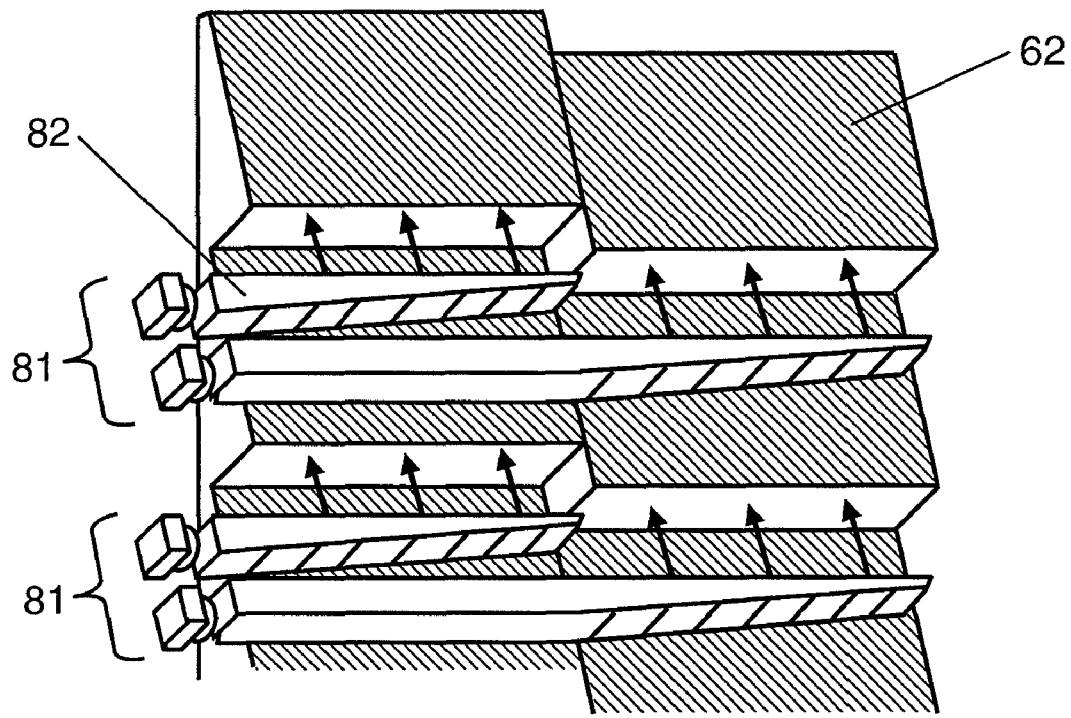
FIG. 25 is a view showing a modification of a structure for optically connecting optical fiber bundles and a light guide plate of FIG. 24.

FIGS. 24 and 25 are schematic diagrams showing a planar illumination device 80 using LED elements 81 as light sources. Although not shown, the respective LED elements are connected with an emission light quantity controller.

With reference to FIG. 24, light from LED elements 81 is guided to a light guide plate 62 via optical fiber bundles 61 each made up of a plurality of optical fibers.

Since it is normally difficult to cause light emitted from the LED element to be efficiently incident on one fiber, light emitted from one LED element 81 is incident on a plurality of optical fibers and the light emitted from the same light source is guided to the same emission region in the light guide plate.

Here, since the quantity of the light incident on the respective optical fibers from the LED element 81 is unlikely to be uniform, it is preferable to arrange the respective optical fibers in consideration of an emission light quantity so that the light becomes uniform linear light at the emitting ends of the respective optical fibers.

It is also possible to use light guide bars 82 capable of emitting light incident on the end surfaces thereof from side surfaces thereof.

Specifically, each light guide bar 82 is tapered from the end surface, on which light is incident. Deflecting portions (e.g. grooves) for deflecting light incident into the light guide bar 82 are formed on one side surface of the light guide bar 82, and the light deflected by the deflecting portions is emitted from a side surface facing the deflecting portions of the light guide bar 82.

If the construction using the light guide bars 82 in this way is employed, light emitted from LED elements can be efficiently guided to the light guide plate.

The LED elements 81 in FIGS. 24 and 25 can be replaced by laser light sources. Even with such a construction, a thin planar illumination device and liquid crystal display device capable of local dimming can be similarly realized.

Figure 26:
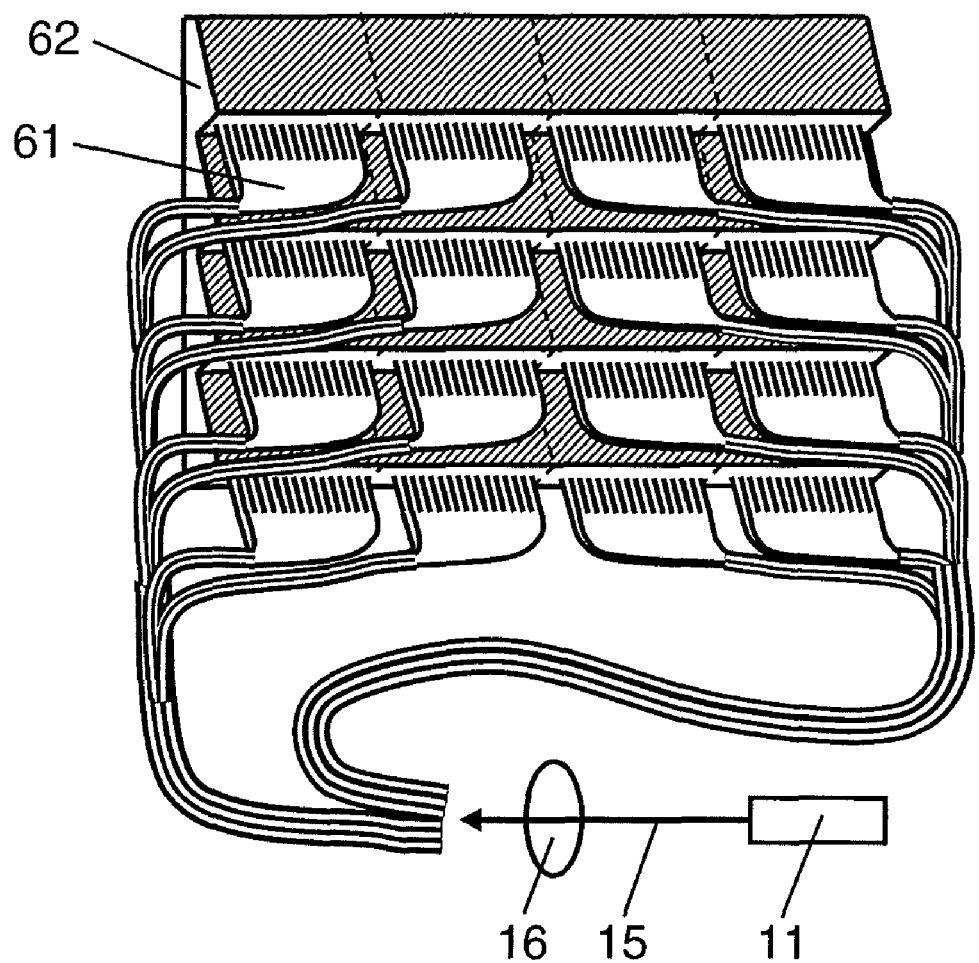
FIG. 26 is a schematic diagram showing a planar illumination device for condensing a laser beam from a laser light source and causing it to be incident on optical fiber bundles.

For the purpose of obtaining a thin and uniform planar illumination device, uniform light may be incident on incident ends of optical fiber bundles 61 as in a planar illumination device 90 shown in FIG. 26.

Specifically, the planar illumination device 90 is constructed such that a laser beam 15 emitted from a laser light source 11 is incident on the incident ends of the optical fiber bundles 61 after being condensed by a condenser lens 16. Here, the condenser lens 16 may focus the laser beam 15 on one of a plurality of (sixteen) optical fiber bundles 61, but may also focus the laser beam 15 on a plurality of bundles.

According to the planar illumination device 90, the laser light source 11 can be freely designed since light guide paths are formed by optical fibers. Thus, the planar illumination device 90 can be thinned. Further, since the laser beam 15 guided by the respective optical fiber bundles 61 can be guided to a plurality of emission regions of the light guide plate in the planar illumination device 90, the light guide plate can be uniformly illuminated.

The above specific embodiments mainly embrace inventions having the following constructions.

A planar illumination device according to one aspect of the present invention comprises a light source; a scanning unit for scanning light emitted from the light source to generate scanned light; a plurality of light guide paths, on which the scanned light in different scanning sections of a scanning range by the scanning unit is respectively incident; and an illumination unit having a plurality of emission regions for emitting the light guided by the respective light guide paths, wherein the number of the emission regions is 2 or more and 1000 or less; and the respective emission regions successively become luminous as the scanned light is incident on the respective light guide paths.

According to the present invention, an illumination area of the planar illumination device can be finely divided and the respective emission regions can be illuminated in a time-sharing manner by causing the scanned light scanned by the scanning unit to be incident on a plurality of light guide paths. Therefore, a planar illumination device with high uniformity can be realized by keeping the quantity of the light emitted from the light source constant.

In the above planar illumination device, it is preferable that a light source controller for controlling an emission light quantity of the light source is further provided; and that the light source controller controls the emission light quantity of the light source according to a luminous state of each emission region of the illumination unit, thereby controlling the luminance of each emission region.

According to this construction, a planar illumination device capable of controlling a luminance distribution can be realized since the luminance of each of the finely divided emission regions of the planar illumination device can be freely set.

In the case of using the planar illumination device according to the present invention as a backlight of a liquid crystal display device or the like, the luminance of the backlight can be adjusted for each emission region in accordance with luminance information of each region of a video to be displayed. Therefore, power consumption can be largely reduced and contrast is improved as compared with the case where the entire area is constantly luminous.

In the above planar illumination device, it is preferable that the light source includes a plurality of light sources for emitting red light, green light and blue light; and the light source controller individually controls the respective light sources.

According to this construction, a planar illumination device capable of controlling a luminance distribution and a color distribution can be realized since the luminance and luminous color of each of the finely divided emission regions can be freely set. Thus, according to the above construction, luminance adjustments can be independently performed for red, green and blue colors. Therefore, power consumption can be more reduced than in the case of a luminance adjustment with white color.

In the above planar illumination device, it is preferable that the light sources are laser light sources; and that maximum numbers of modulations of emission light quantities of the laser light sources for emitting the red light and blue light is larger than that of modulations of an emission light quantity of the laser light source for emitting the green light.

According to this construction, luminance adjustments can be performed for the finely divided emission regions as for the red and blue light sources, for which a light quantity control speed can be increased. Thus, power consumption can be reduced as compared with the case where luminance adjustments of the respective colors are performed in conformity with the green light source, for which it is obliged to slow the light quantity control speed.

In the above planar illumination device, it is preferable that the light sources are laser light sources; and that the number of laser light sources for emitting the green light is larger than those of laser light sources for emitting the red light and blue light.

According to this construction, by increasing the number of the green light sources having a lower response speed than the red and blue light sources over the numbers of the red and blue light sources, the partition number of a screen for green light can be set equal to those for red light and blue light. Therefore, power consumption can be further reduced.

In the above planar illumination device, the scanning unit preferably includes a rotating polygon mirror.

According to this construction, since high-speed scanning is possible with a simple construction, the partition number of the screen can be increased and a planar illumination device capable of more finely controlling a luminance distribution can be realized.

In the above planar illumination device, the scanning unit preferably includes a one-axis or two-axis MEMS mirror.

According to this construction, the scanning unit can be miniaturized and a thinner planar illumination device can be realized.

In the above planar illumination device, the scanning unit preferably includes a rotating mirror having a reflecting surface inclined substantially at 45° with respect to a rotary shaft, causes light to be incident on the reflecting surface in a direction parallel to the rotary shaft and rotates the rotating mirror about the rotary shaft, thereby scanning reflected light from the reflecting surface in a range of 360° about the rotary shaft.

According to this construction, higher light utilization efficiency can be obtained since the scanning unit is not influenced by an efficiency reduction caused by the angle dependency of the reflectance of the reflecting surface. Further, since the reflected light is scanned in the wide range of 360°, the number of split beams of the scanned light can be easily increased. By increasing the partition number of the illumination area in correspondence with the number of split beams, a planar illumination device capable of more finely controlling a luminance distribution can be realized.

In the above planar illumination device, the light guide paths preferably have tapered shapes whose cross-sectional areas increase in a propagation direction of the scanned light and are formed to propagate the scanned light while totally reflecting it by side surfaces thereof.

According to this construction, since a variation in the propagation direction of the light traveling in the light guide paths can be reduced, the emission regions can be made uniformly luminous even if light is incident on the respective emission regions of the light guide plate with a specified divergence angle.

In the above planar illumination device, the light guide paths are pipes including tapered inner side surfaces formed to increase the area of a hollow part in the propagation direction of the scanned light and transmit the scanned light while reflecting it by the inner side surfaces.

Since a variation in the propagation direction of the light traveling in the light guide paths can be reduced even with such a construction, the emission regions can be made uniformly luminous even if light is incident on the respective emission regions of the light guide plate with a specified divergence angle.

In the above planar illumination device, the light guide paths are preferably optical fibers.

According to this construction, a degree of freedom in arranging the light sources and a scanning optical system is improved and an even thinner planar illumination device can be realized.

In the above planar illumination device, it is preferable that the light guide paths are made of a two-dimensional photonic crystal; that the photonic crystal includes a slab-like main body member; that the main body member has a plurality of different refractive index regions having a refractive index different from that of the main body member and defect regions linearly formed between the different refractive index regions; and that the light guide paths are formed by the defect regions.

According to this construction, thin and efficient light guide paths can be formed and a thin planar illumination device can be realized since the defect regions of the slab-like (flat) main body member can be utilized as the light guide paths.

In the above planar illumination device, it is preferable that each light guide path includes an emitting portion for emitting light guided thereinto; the planar illumination device further comprises a first reflecting portion for transmitting a part of the light emitted from at least one of the respective emitting portions while reflecting the remaining part and a second reflecting portion for reflecting the light reflected by the first reflecting portion toward the first reflecting portion; and that the respective emission regions are made luminous by the light having transmitted through the first reflecting portion.

According to this construction, a uniform planar illumination device with high light utilization efficiency can be realized since the light emitted from the emitting portions is uniformly spread while being repeatedly reflected between the first and second reflecting portions and is emitted from the first reflecting portion.

In the above planar illumination device, it is preferable that a light guide plate for emitting light incident on a plurality of incident portions from one principal surface is further provided; that each light guide path includes a linear emitting portion for emitting light guided into the light guide path from a linear region and causing it to be incident on the corresponding incident portions; that a plurality of emission regions for emitting the light incident on the respective incident portions are set in the principal surface of the light guide plate in correspondence with the number of the incident portions; and that light emitted from at least one of the respective linear emitting portions is incident on the incident portion of the light guide plate.

According to this construction, a thin planar illumination device can be realized by employing an edge-light construction.

In the above planar illumination device, it is preferable that the linear emitting portions are bar-shaped light guides; and that deflecting grooves for deflecting light guided by the light guide paths toward the incident portions of the light guide plate are formed in a surface of the bar-shaped light guide at a side opposite to the incident portions of the light guide plate.

According to this construction, linear light can be incident on the light guide plate using a simple construction of deflecting grooves.

In the above planar illumination device, it is preferable that the plurality of light guide paths are formed by optical fibers; and that emitting ends of a plurality of optical fibers whose incident ends are arranged in the same scanning section by the scanning unit out of all the optical fibers are respectively linearly arranged to form the linear emitting portion.

According to this construction, by using the optical fibers as the light guide paths, a degree of freedom in arranging the light sources and the scanning optical system is improved and an even thinner planar illumination device can be realized. Further, since the scanned light in the same scanning section can be linearly guided to the light guide plate using a plurality of optical fibers, uniform light can be guided to the incident portion of the light guide plate and a thin planar illumination device with high uniformity can be realized.

In the above planar illumination device, it is preferable that trailing ends of the plurality of optical fibers whose incident ends are arranged in the same scanning section by the scanning unit form a fiber sheet in which the respective optical fibers are so arranged in a sheet-like manner as to be parallel to each other; that the fiber sheet is formed to emit light from one sheet surface facing in a direction orthogonal to the axial lines of the optical fibers; that the sheet surface forms the emission region; and that a plurality of sheet surfaces are planarly arranged to form the illumination unit.

According to this construction, since the illumination unit can be formed using the fiber sheets instead of the light guide plate, an even thinner construction is possible as compared with the case where the light guide paths and the illumination unit are formed by separate members. Further, since the light guide paths and the illumination unit can be formed by the optical fibers, a light loss by connection between the light guide paths and the illumination unit can be eliminated to improve light utilization efficiency.

In the planar illumination device, it is preferable that wedge-shaped grooves are so formed in a cladding and a core of a sheet surface of each fiber sheet opposite to the one sheet surface as to deflect light propagating in each core toward the one sheet surface.

According to this construction, one of the sheet surfaces of each fiber sheet can be effectively made luminous using a simple construction of wedge-shaped grooves.

In the above planar illumination device, it is preferable that the light source includes two light sources which emit beams of light having polarization directions orthogonal to each other and can independently control emission light quantities of the beams of light having the different polarization directions; that the scanning unit further includes a polarization beam splitter having an optical surface inclined substantially at 45° with respect to the rotary shaft; and that the optical surface reflects one of the two beams of light having the different polarization directions and transmits the other beam of light toward the reflecting surface.

According to this construction, the two beams of light having the different polarization directions are separated by the polarization beam splitter and the polarized and separated beams of light can be scanned to be incident on different regions by the optical surface and the reflecting surface. Thus, an increase of scanning optical systems can be suppressed even if the number of light sources is increased to increase the partition number of the illumination area.

In the above planar illumination device, it is preferable that the light source emits light obtained by combing red light, green light and blue light; that the scanning unit further includes a wavelength separating element having an optical surface inclined substantially at 45° with respect to the rotary shaft; and that the optical surface wavelength-separates the light emitted from the light source by transmission and reflection.

According to this construction, red light, green light and blue light can be separated and scanned using one scanning optical system.

In the above planar illumination device, the scanning unit is preferably formed to scan the red light, green light and blue light separated by the wavelength separating element in different ranges so that the red light, green light and blue light do not simultaneously illuminate the same emission region.

According to this construction, since red light, green light and blue light can be guided to the respective emission regions with time lags, a combination with the field sequential drive of a liquid crystal panel is possible and a liquid crystal display device with high light utilization efficiency can be realized.

In the above planar illumination device, it is preferable that the light guide paths are formed by a plurality of optical fibers; that the light source is formed such that the red light, green light and blue light are respectively incident on different ones of the optical fibers; that trailing ends of the optical fibers are arranged in a sheet-like manner such that the optical fibers for respectively guiding the red light, green light and blue light are parallel to each other in a specified order, thereby forming a fiber sheet; that the fiber sheet is so formed as to emit light from one principal surface thereof; that the sheet surface forms the emission region; and that a plurality of sheet surfaces are planarly arranged to form the illumination unit.

According to this construction, by adjusting the arrangement of the optical fibers in conformity with the arrangement of RGB pixels of a liquid crystal display panel, red light, green light and blue light can be efficiently incident on the respective RGB pixels when the planar illumination device is combined with the liquid crystal display panel. Therefore, a liquid crystal display device with high light utilization efficiency can be realized.

Further, a liquid crystal display device according to another aspect of the present invention comprises a liquid crystal display panel; and a backlight illumination device for illuminating the liquid crystal display panel from behind, wherein the above planar illumination device is used as the backlight illumination device.

According to the liquid crystal display device of the present invention, it is possible to realize a liquid crystal display device with good color reproducibility, high luminance and little luminance nonuniformity even when having a large screen. It is also possible to realize a thin liquid crystal display device.

A liquid crystal display device according to still another aspect of the present invention comprises a liquid crystal display panel; and a backlight illumination device for illuminating the liquid crystal display panel from behind, wherein a planar illumination device including a plurality of light sources for respectively emitting red light, green light and blue light and a light source controller for individually controlling the respective light sources is used as the backlight illumination device; and the light source controller sets a luminance distribution of a corresponding region of the planar illumination device in accordance with a luminance distribution of each color of each region of image data to be displayed on the liquid crystal display panel.

According to the liquid crystal display device of the present invention, local dimming is possible and high contrast can be realized while power consumption is reduced. Further, it is possible to realize a liquid crystal display device with good color reproducibility, high luminance and little luminance nonuniformity even when having a large screen. It is also possible to realize a thin liquid crystal display device.

INDUSTRIAL APPLICABILITY

A planar illumination device of the present invention and a liquid crystal display device using the same can reduce power consumption by local dimming and realize high contrast in addition to being able to realize a display free from luminance nonuniformity.

Further, since the device can be thinned using a laser light source with high luminance and a wide color reproduction range, it is useful in the display field such as large-size displays and high-luminance displays.

What is claimed is:

1. A planar illumination device, comprising:
    a light source;
    a light source controller for controlling an emission light quantity of the light source;
    a scanning unit for scanning light emitted from the light source to generate scanned light in different scanning sections of a scanning range;
    a plurality of light guide paths on which the different scanning sections of the light are respectively incident; and
    an illumination unit having a plurality of emission regions for emitting the light guided by the respective light guide paths,
    wherein:
    the number of the emission regions is 2 or more and 1000 or less;
    the respective emission regions successively become luminous as the scanned light is incident on the respective light guide paths; and
    the light source controller controls the emission light quantity of the light source according to a luminous state of each emission region of the illumination unit, thereby controlling the luminance of each emission region.

2. A planar illumination device according to claim 1, wherein:
    the light source includes a plurality of light sources for emitting red light, green light and blue light; and
    the light source controller individually controls the respective light sources.

3. A planar illumination device according to claim 2, wherein:
    the light sources are laser light sources; and
    maximum numbers of modulations of emission light quantities of the laser light sources for emitting the red light and blue light is larger than that of modulations of an emission light quantity of the laser light source for emitting the green light.

4. A planar illumination device according to claim 2, wherein:
    the light sources are laser light sources; and
    the number of laser light sources for emitting the green light is larger than those of laser light sources for emitting the red light and blue light.

5. A planar illumination device according to claim 1, wherein the scanning unit includes a rotating polygon mirror.

6. A planar illumination device according to claim 1, wherein the scanning unit includes a one-axis or two-axis MEMS mirror.

7. A planar illumination device according to claim 1, wherein the scanning unit includes a rotating mirror having a reflecting surface inclined substantially at 45° with respect to a rotary shaft, causes light to be incident on the reflecting surface in a direction parallel to the rotary shaft and rotates the rotating mirror about the rotary shaft, thereby scanning reflected light from the reflecting surface in a range of 360° about the rotary shaft.

8. A planar illumination device according to claim 1, wherein the light guide paths have tapered shapes whose cross-sectional areas increase in a propagation direction of the scanned light and are formed to propagate the scanned light while totally reflecting it by side surfaces thereof.

9. A planar illumination device according to claim 1, wherein the light guide paths are pipes including tapered inner side surfaces formed to increase the area of a hollow part in the propagation direction of the scanned light and transmit the scanned light while reflecting it by the inner side surfaces.

10. A planar illumination device according to claim 1, wherein the light guide paths are optical fibers.

11. A planar illumination device according to claim 1, wherein:
    the light guide paths are made of a two-dimensional photonic crystal;
    the photonic crystal includes a slab-like main body member;
    the main body member has a plurality of different refractive index regions having a refractive index different from that of the main body member and defect regions linearly formed between the different refractive index regions; and
    the light guide paths are formed by the defect regions.

12. A planar illumination device according to claim 1, wherein:
    each light guide path includes an emitting portion for emitting light guided thereinto;
    the planar illumination device further comprises a first reflecting portion for transmitting a part of the light emitted from at least one of the respective emitting portions while reflecting the remaining part and a second reflecting portion for reflecting the light reflected by the first reflecting portion toward the first reflecting portion; and the respective emission regions are made luminous by the light having transmitted through the first reflecting portion.

13. A planar illumination device according to claim 1, wherein:
a light guide plate for emitting light incident on a plurality of incident portions from one principal surface is further provided;
each light guide path includes a linear emitting portion for emitting light guided into the light guide path from a linear region and causing it to be incident on the corresponding incident portions;
a plurality of emission regions for emitting the light incident on the respective incident portions are set in the principal surface of the light guide plate in correspondence with the number of the incident portions; and
light emitted from at least one of the respective linear emitting portions is incident on the incident portion of the light guide plate.

14. A planar illumination device according to claim 13, wherein:
the linear emitting portions are bar-shaped light guides; and
deflecting grooves for deflecting light guided by the light guide paths toward the incident portions of the light guide plate are formed in a surface of the bar-shaped light guide at a side opposite to the incident portions of the light guide plate.

15. A planar illumination device according to claim 13, wherein:
the plurality of light guide paths are formed by optical fibers; and
emitting ends of a plurality of optical fibers whose incident ends are arranged in the same scanning section by the scanning unit out of all the optical fibers are respectively linearly arranged to form the linear emitting portion.

16. A planar illumination device according to claim 10, wherein:
trailing ends of the plurality of optical fibers whose incident ends are arranged in the same scanning section by the scanning unit form a fiber sheet in which the respective optical fibers are so arranged in a sheet-like manner as to be parallel to each other;
the fiber sheet is formed to emit light from one sheet surface facing in a direction orthogonal to the axial lines of the optical fibers;
the sheet surface forms the emission region; and
a plurality of sheet surfaces are planarly arranged to form the illumination unit.

17. A planar illumination device according to claim 16, wherein wedge-shaped grooves are so formed in a cladding and a core of a sheet surface of each fiber sheet opposite to the one sheet surface as to deflect light propagating in each core toward the one sheet surface.

18. A planar illumination device according to claim 7, wherein:
the light source includes two light sources which emit beams of light having polarization directions orthogonal to each other and can independently control emission light quantities of the beams of light having the different polarization directions;
the scanning unit further includes a polarization beam splitter having an optical surface inclined substantially at 45° with respect to the rotary shaft; and
the optical surface reflects one of the two beams of light having the different polarization directions and transmits the other beam of light toward the reflecting surface.

19. A planar illumination device according to claim 7, wherein:
the light source emits light obtained by combing red light, green light and blue light;
the scanning unit further includes a wavelength separating element having an optical surface inclined substantially at 45° with respect to the rotary shaft; and
the optical surface wavelength-separates the light emitted from the light source by transmission and reflection.

20. A planar illumination device according to claim 19, wherein the scanning unit is formed to scan the red light, green light and blue light separated by the wavelength separating element in different ranges so that the red light, green light and blue light do not simultaneously illuminate the same emission region.

21. A planar illumination device according to claim 19, wherein:
the light guide paths are formed by a plurality of optical fibers;
the light source is formed such that the red light, green light and blue light are respectively incident on different ones of the optical fibers;
trailing ends of the optical fibers are arranged in a sheet-like manner such that the optical fibers for respectively guiding the red light, green light and blue light are parallel to each other in a specified order, thereby forming a fiber sheet;
the fiber sheet is so formed as to emit light from one principal surface thereof;
the one principal surface forms the emission regions; and
a plurality of the one principal surfaces are arranged in a plane to form the illumination unit.

22. A liquid crystal display device, comprising:
a liquid crystal display panel; and
a backlight illumination device for illuminating the liquid crystal display panel from behind,
wherein the planar illumination device according to claim 1 is used as the backlight illumination device.

23. A liquid crystal display device, comprising:
a liquid crystal display panel; and
a backlight illumination device for illuminating the liquid crystal display panel from behind,
wherein:
the planar illumination device according to claim 2 is used as the backlight illumination device; and
the light source controller sets a luminance distribution of a corresponding region of the planar illumination device in accordance with a luminance distribution of each color of each region of image data to be displayed on the liquid crystal display panel.

24. A planar illumination device according to claim 2, further comprising an optical fiber which receives light from each of the light sources, and which directs the light received from each of the light sources onto the scanning unit.

25. A planar illumination device according to claim 18, further comprising an optical fiber which receives light from each of the light sources, and which directs the light received from each of the light sources onto the scanning unit.

* * * * *